(12) United States Patent
Shibai et al.

(10) Patent No.: US 10,800,868 B2
(45) Date of Patent: Oct. 13, 2020

(54) ANTIFOULING FILM AND POLYMERIZABLE COMPOSITION

(71) Applicant: Sharp Kabushiki Kaisha, Sakai, Osaka (JP)

(72) Inventors: Yasuhiro Shibai, Sakai (JP); Tokio Taguchi, Sakai (JP); Kenichiro Nakamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/690,185

(22) Filed: Nov. 21, 2019

(65) Prior Publication Data

US 2020/0165369 A1    May 28, 2020

(30) Foreign Application Priority Data

Nov. 28, 2018    (JP) .................. 2018-222344

(51) Int. Cl.
  *C08F 222/20* (2006.01)
  *G02B 1/18* (2015.01)
(52) U.S. Cl.
  CPC .............. *C08F 222/20* (2013.01); *G02B 1/18* (2015.01); *C08F 2800/20* (2013.01)
(58) Field of Classification Search
  CPC ................................ C08F 222/20; G02B 1/18
  USPC ........................................................ 428/141
  See application file for complete search history.

(56) References Cited

U.S. PATENT DOCUMENTS

| 2013/0210957 | A1 | 8/2013 | Takihara et al. | |
| 2014/0077418 | A1* | 3/2014 | Otani | B29C 59/046 |
| | | | | 264/447 |
| 2016/0054478 | A1* | 2/2016 | Otani | G02B 1/118 |
| | | | | 428/141 |
| 2016/0229095 | A1* | 8/2016 | Mori | G02B 1/118 |
| 2016/0319062 | A1* | 11/2016 | Saito | C08F 220/24 |
| 2017/0315396 | A1* | 11/2017 | Saiki | B32B 3/28 |
| 2019/0016900 | A1* | 1/2019 | Hayashi | C09D 7/65 |
| 2019/0169441 | A1 | 6/2019 | Yamashita et al. | |

FOREIGN PATENT DOCUMENTS

| JP | 2015-138150 A | 7/2015 | |
| JP | 2018-059047 A | 4/2018 | |
| WO | 2011/125970 A1 | 10/2011 | |
| WO | WO-2018012340 A1 * | 1/2018 | ............. B32B 27/18 |
| WO | 2018/155317 A1 | 8/2018 | |

* cited by examiner

*Primary Examiner* — Tahseen Khan
(74) *Attorney, Agent, or Firm* — Keating & Bennett, LLP

(57) ABSTRACT

An antifouling film includes: a substrate; and a polymer layer disposed on a surface of the substrate and including on a surface thereof an uneven structure provided with projections at a pitch not longer than a wavelength of visible light. The polymer layer is a cured product of a polymerizable composition. The polymerizable composition contains, in terms of active components, 75 to 95 wt % of a polymerizable monomer, 2.5 to 12.5 wt % of a urethane acrylate containing fluorine and an ester, and 2.5 to 9 wt % of a perfluoroalkyl-based monomer containing one (meth)acryloyl group for each molecule. The polymerizable monomer contains a bifunctional acrylate that contains an ethylene oxide group and a multifunctional acrylate that contains no ethylene oxide group. The perfluoroalkyl-based monomer has a fluorine atom concentration of 50 to 60 wt %. The polymerizable composition has an ethylene oxide group concentration of 20 to 50 wt %.

10 Claims, 2 Drawing Sheets

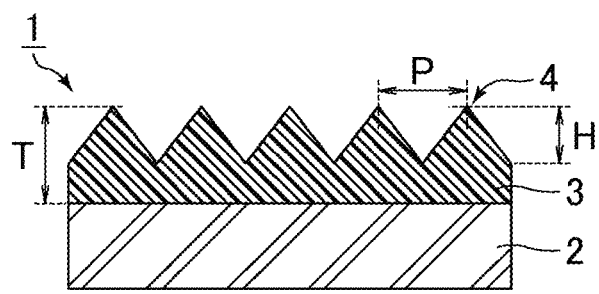
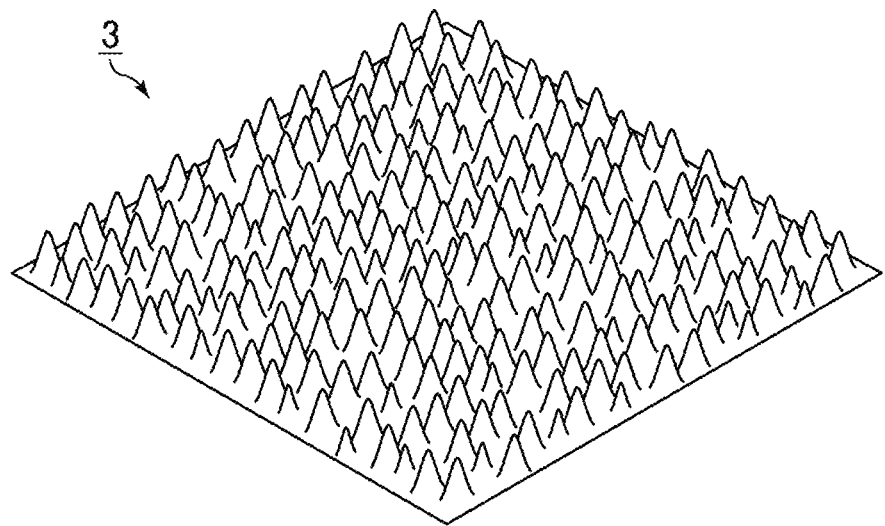

ANTIFOULING FILM AND POLYMERIZABLE COMPOSITION

CROSS-REFERENCE TO RELATED APPLICATIONS

The present application claims priority under 35 U.S.C. § 119 to Japanese Patent Application No. 2018-222344 filed on Nov. 28, 2018, the contents of which are incorporated herein by reference in their entirety.

BACKGROUND OF THE INVENTION

Field of the Invention

The present invention relates to antifouling films and polymerizable compositions.

Description of Related Art

Various antireflective optical films have been studied (e.g., WO 2011/125970, JP 2018-59047, and WO 2018/155317). In particular, optical films including an uneven structure of nanometer scale (nanostructure) are known for their excellent antireflective properties. This uneven structure has a continuously varying refractive index from the air layer to the substrate, thereby capable of reducing the reflected light significantly. Meanwhile, hard coating films for an optical film, which have rubbing resistance, have been studied (e.g., JP 2015-138150 A) although they do not have antireflective properties.

BRIEF SUMMARY OF THE INVENTION

Although optical films including an uneven structure of nanometer scale have excellent antireflective properties, the uneven structure on the surface may cause easy spread of dirt such as fingerprints (sebaceous dirt) sticking thereon and further cause difficulty in wiping off such dirt present between projections. Such sticking dirt has a reflectance that is very different from the reflectance of the optical film, and thus is noticeable. This has increased the demand for functional films (antifouling films) including on their surfaces an uneven structure of nanometer scale and showing excellent ease of wiping off dirt (e.g., ease of wiping off fingerprints), i.e., excellent antifouling properties.

The present inventors made studies on such films, and found that the antifouling properties thereof can be increased by using a fluorine-based compound as a component of a polymer layer constituting the uneven structure of the optical film.

Unfortunately, the inventors found through further studies that some polymer layers having specific components have antifouling properties that tend to decrease with time although they are high at an initial stage. The optical films disclosed in WO 2011/125970, JP 2018-59047, and WO 2018/155317 still have room for achieving long-term high antifouling properties.

JP 2015-138150 A discloses a hard coat layer containing a fluorine-based compound as a component. The disclosed technique, unfortunately, is not applied to polymer layers having an uneven structure as described above. Only using a fluorine-based compound is not enough to impart long-term high antifouling properties to polymer layers having an uneven structure.

In response to the above issues, an object of the present invention is to provide an antifouling film having excellent rubbing resistance and long-term high antifouling properties, and a polymerizable composition for providing a polymer layer of the antifouling film.

An aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 75 to 95 wt % of a polymerizable monomer, 2.5 to 12.5 wt % of a urethane acrylate containing fluorine and an ester, and 2.5 to 9 wt % of a perfluoroalkyl-based monomer containing one (meth)acryloyl group for each molecule, the polymerizable monomer containing a bifunctional acrylate that contains an ethylene oxide group and a multifunctional acrylate that contains no ethylene oxide group, the perfluoroalkyl-based monomer having a fluorine atom concentration of 50 to 60 wt %, the polymerizable composition having an ethylene oxide group concentration of 20 to 50 wt %.

Another aspect of the present invention may be a polymerizable composition including in terms of active components: 75 to 95 wt % of a polymerizable monomer; 2.5 to 12.5 wt % of a urethane acrylate containing fluorine and an ester; and 2.5 to 9 wt % of a perfluoroalkyl-based monomer containing one (meth)acryloyl group for each molecule, the polymerizable monomer containing a bifunctional acrylate that contains an ethylene oxide group and a multifunctional acrylate that contains no ethylene oxide group, the perfluoroalkyl-based monomer having a fluorine atom concentration of 50 to 60 wt %, the polymerizable composition having an ethylene oxide group concentration of 20 to 50 wt %.

The present invention can provide an antifouling film having excellent rubbing resistance and long-term high antifouling properties and a polymerizable composition for providing a polymer layer of the antifouling film.

BRIEF DESCRIPTION OF THE DRAWINGS

FIG. 1 is a schematic cross-sectional view of an antifouling film of an embodiment.

FIG. 2 is a schematic perspective view of a polymer layer in FIG. 1.

DETAILED DESCRIPTION OF THE INVENTION

Figure 3A:
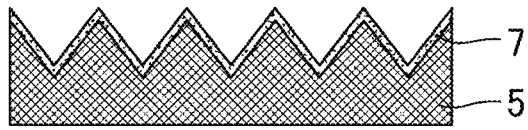
FIG. 3A is a schematic cross-sectional view illustrating an exemplary method for producing the antifouling film of the embodiment.

The present invention is described in more detail based on the following embodiment with reference to the drawings. The embodiment, however, is not intended to limit the scope of the present invention. The configurations of the embodiment may appropriately be combined or modified within the spirit of the present invention.

The expression "X to Y" as used herein means "X or more and Y or less".

Embodiment

An antifouling film of an embodiment is described below. FIG. 1 is a schematic cross-sectional view of the antifouling film of the embodiment. FIG. 2 is a schematic perspective view of a polymer layer in FIG. 1.

An antifouling film 1 includes a substrate 2 and a polymer layer 3 disposed on a surface of the substrate 2.

<Substrate>

The material of the substrate 2 may be, for example, a resin such as triacetyl cellulose (TAC), polyethylene terephthalate (PET), or methyl methacrylate (MMA). The substrate 2 may further contain appropriate additive(s) such as a plasticizer in addition to the above material.

One surface (the surface close to the polymer layer 3) of the substrate 2 may have undergone easy adhesion treatment (e.g., primer treatment). For example, a triacetyl cellulose film after easy adhesion treatment may be used. The surface (the surface close to the polymer layer 3) of the substrate 2 may alternatively have undergone saponification treatment. For example, a saponified triacetyl cellulose film may be used.

When the antifouling film 1 is mounted on a display device (e.g., liquid crystal display device) provided with a polarizing plate, the substrate 2 may be part of the polarizing plate.

The substrate 2 preferably has a thickness of 50 to 100 μm in order to ensure the transparency and processability.

<Polymer Layer>

The polymer layer 3 includes on a surface thereof an uneven structure provided with projections (protrusions) 4 at a pitch (distance between the apexes of adjacent projections 4) P not longer than the wavelength (780 nm) of visible light, i.e., a moth-eye structure (a structure like a moth's eye). Thus, the antifouling film 1 can exert excellent antireflective properties (low reflectivity) owing to the moth-eye structure.

The thickness T of the polymer layer 3 is preferably small in order to allow easy concentration of fluorine atoms in fluorine-based compounds, which are to be added to the later described polymerizable composition, on a surface (the surface remote from the substrate 2) of the polymer layer 3. Specifically, the polymer layer 3 has a thickness T of preferably 5 to 20 μm, more preferably 8 to 12 μm.

Examples of the shape of each projection 4 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 4 are inclined, but the bases may not be inclined but may be flat.

The projections 4 are disposed at an average pitch of preferably 100 to 400 nm, more preferably 100 to 200 nm, for sufficient prevention of optical phenomena such as moiré and iridescence. The average pitch of the projections 4 specifically means the average value of the pitches (P in FIG. 1) of all the adjacent projections within a 1-μm-square region in a plan image taken by a scanning electron microscope.

The projections 4 have an average height of preferably 50 to 600 nm, more preferably 100 to 300 nm, for simultaneous achievement of a preferred average height and a preferred average aspect ratio of the projections 4, which is described later. The average height of the projections 4 specifically means the average value of the heights (H in FIG. 1) of 10 consecutive projections in a cross-sectional image taken by a scanning electron microscope. These 10 projections are selected so as not to include projections having any defect or deformed portion (e.g., a portion accidentally deformed during preparation of a measurement sample).

The projections 4 have an average aspect ratio of preferably 0.8 to 1.5, more preferably 1.0 to 1.3. If the average aspect ratio of the projections 4 is smaller than 0.8, the film may insufficiently prevent occurrence of optical phenomena such as moiré and iridescence, possibly failing to achieve excellent antireflective properties. If the average aspect ratio of the projections 4 is greater than 1.5, the processability of the uneven structure may be poor, sticking may occur, and transfer conditions of a die in formation of the uneven structure may be poor (clogging of the die or twining of the material may occur). The average aspect ratio of the projections 4 as used herein means the ratio of the average height of the projections 4 to the average pitch of the projections 4 (height/pitch).

The projections 4 may be arranged either randomly or periodically (regularly). Periodically arranged projections 4 may cause unnecessary diffracted light due to the periodicity. Thus, the projections 4 are preferably arranged randomly as shown in FIG. 2.

The polymer layer 3 is a cured product of a polymerizable composition. Examples of the polymer layer 3 include a cured product of an active energy ray-curable polymerizable composition (cured product of a photopolymerizable composition) and a cured product of a thermosetting polymerizable composition. The "active energy rays" herein mean ultraviolet rays, visible light, infrared rays, plasma, or the like. The polymer layer 3 is preferably a cured product of an active energy ray-curable polymerizable composition, more preferably a cured product of an ultraviolet ray-curable polymerizable composition.

The polymerizable composition constituting the polymer layer 3 contains a polymerizable monomer (R), a urethane acrylate (S) containing fluorine and an ester, and a perfluoroalkyl-based monomer (T) containing one (meth)acryloyl group for each molecule. The "(meth)acryloyl group" herein means an acryloyl group or a methacryloyl group.

(Polymerizable Monomer (R))

The polymerizable monomer (R) is a monomer containing no fluorine atoms and containing a polymerizable functional group (e.g., acryloyl group) that reacts with a different component by external energy such as light or heat.

The polymerizable composition contains, in terms of active components, 75 to 95 wt %, preferably 85 to 91 wt %, of the polymerizable monomer (R). A polymerizable composition having a polymerizable monomer (R) content of lower than 75 wt % in terms of active components hardens the polymer layer 3 and reduces the rubbing resistance of the antifouling film 1. A polymerizable composition having a polymerizable monomer (R) content of higher than 95 wt % in terms of active components fails to increase the cross-linking density of the polymer layer 3 and reduces the rubbing resistance of the antifouling film 1. When the surface (the surface remote from the substrate 2) of the polymer layer 3 of such an antifouling film 1 having reduced rubbing resistance is rubbed with soft material such as non-woven cloth, for example, the projections 4 do not rise and the rubbed part has a reflectance different from non-rubbed part and appears white. When the polymerizable composition contains multiple kinds of the polymerizable monomers (R), the total amount of the multiple kinds of the polymerizable monomers (R) is 75 to 95 wt % in terms of active components.

The "active components" of the polymerizable composition herein refer to those constituting the polymer layer after curing, excluding those (e.g., solvent) not contributing to the curing reaction (polymerization reaction).

The polymerizable monomer (R) contains a bifunctional acrylate (R1) that contains an ethylene oxide group and a multifunctional acrylate (R2) that contains no ethylene oxide group. The "multifunctional acrylate" herein means an acrylate that contains two or more acryloyl groups for each molecule. The "bifunctional acrylate" thus means an acrylate that contains two acryloyl groups for each molecule.

The presence of the multifunctional acrylate in the polymerizable composition increases the crosslinking density of the polymer layer 3 and provides favorable elasticity (hardness), which increases the rubbing resistance of the antifouling film 1. Studies by the inventors have revealed that introducing an ethylene oxide group (soft segment) into the multifunctional acrylate further increases the rubbing resistance. Unfortunately, when the introduction of an ethylene oxide group increases the molecular weight of the multifunctional acrylate, the multifunctional acrylate may reduce the compatibility of the polymerizable monomer (R) with other component(s) (e.g., fluorine-based compound) in the polymerizable composition, which may result in reduced transparency (whitening) of the antifouling film 1 (polymer layer 3). In the present embodiment, addition of the multifunctional acrylate (R2) ensures the rubbing resistance to some extent, and addition of the bifunctional acrylate (R1), which is prepared by introducing an ethylene oxide group into a bifunctional acrylate having a relatively low molecular weight, ensures the compatibility with other component(s) (e.g., fluorine-based compound) in the polymerizable composition and further increases the rubbing resistance.

The polymerizable composition preferably contains 35 to 75 wt % of the bifunctional acrylate (R1) in terms of active components. A polymerizable composition having a bifunctional acrylate (R1) content of lower than 35 wt % in terms of active components may harden the polymer layer 3 and may reduce the rubbing resistance of the antifouling film 1. A polymerizable composition having a bifunctional acrylate (R1) content of higher than 75 wt % in terms of active components may fail to increase the crosslinking density of the polymer layer 3 and may reduce the rubbing resistance of the antifouling film 1. When the polymerizable composition contains multiple kinds of bifunctional acrylates (R1), the total amount of the multiple kinds of bifunctional acrylates (R1) is preferably within the above range in terms of active components.

Examples of the bifunctional acrylate (R1) include polyethylene glycol (200) diacrylate and polyethylene glycol (400) diacrylate.

Known examples of the polyethylene glycol (200) diacrylate include "MIRAMER® M282" available from Miwon Specialty Chemical Co., Ltd. Known examples of the polyethylene glycol (400) diacrylate include "MIRAMER M280" available from Miwon Specialty Chemical Co., Ltd.

The number of functional groups of the multifunctional acrylate (R2) is 2 or more, preferably 3 to 6. "The number of functional groups of a multifunctional acrylate" herein means the number of acryloyl groups for each molecule. When the number of functional groups of the multifunctional acrylate (R2) is more than 6, the increase in the molecular weight reduces the compatibility with other components (e.g., fluorine-based compound) in the polymerizable composition, which may result in reduced transparency (whitening) of the antifouling film 1 (polymer layer 3). Furthermore, the polymer layer 3 may have too high a crosslinking density and fluorine atoms in the fluorine-based compounds are less likely to concentrate on the surface (the surface remote from the substrate 2) of the polymer layer 3, which may fail to impart long-term high antifouling properties to the antifouling film 1.

The polymerizable composition preferably contains 5 to 45 wt % of the multifunctional acrylate (R2) in terms of active components. A polymerizable composition having a multifunctional acrylate (R2) content of lower than 5 wt % in terms of active components may harden the polymer layer 3 and may reduce the rubbing resistance of the antifouling film 1. A polymerizable composition having a multifunctional acrylate (R2) content of higher than 45 wt % in terms of active components may fail to increase the crosslinking density of the polymer layer 3 and may reduce the rubbing resistance of the antifouling film 1. When the polymerizable composition contains multiple kinds of multifunctional acrylates (R2), the total amount of the multiple kinds of multifunctional acrylates (R2) is preferably within the above range in terms of active components.

Examples of the multifunctional acrylate (R2) include trimethylolpropane triacrylate, dipentaerythritol hexaacrylate, and urethane acrylate.

Known examples of the trimethylolpropane triacrylate include "MIRAMER M300" available from Miwon Specialty Chemical Co., Ltd. Known examples of the dipentaerythritol hexaacrylate include "MIRAMER M600" available from Miwon Specialty Chemical Co., Ltd. Known examples of the urethane acrylate include "U-10HA" available from Shin-Nakamura Chemical Co., Ltd.

The polymerizable monomer (R) may further contain a monofunctional amide monomer. The "monofunctional amide monomer" herein means a monomer that contains an amide group and contains one acryloyl group for each molecule.

The presence of the monofunctional amide monomer in the polymerizable composition increases the compatibility with a fluorine-based compound, which allows easy concentration of fluorine atoms in the fluorine-based compounds on the surface (the surface remote from the substrate 2) of the polymer layer 3 and sufficiently increases the antifouling properties of the antifouling film 1. This also inhibits shrinkage during curing of the polymerizable composition and increases the cohesion with the substrate 2, whereby the adhesion between the polymer layer 3 and the substrate 2 increases.

The polymerizable composition may contain preferably 1 to 15 wt %, more preferably 5 to 10 wt %, of the monofunctional amide monomer in terms of active components. A polymerizable composition having a monofunctional amide monomer content of lower than 1 wt % in terms of active components may fail to sufficiently increase the adhesion between the polymer layer 3 and the substrate 2. A polymerizable composition having a monofunctional amide monomer content of higher than 15 wt % in terms of active components may cause permeation of the monofunctional amide monomer into a die during die transferring in formation of an uneven structure and may cause a reduction in release properties of the die, whereby the antifouling film 1 may fail to have sufficiently increased antifouling properties. A polymerizable composition having such a monofunctional amide monomer content may also fail to increase the crosslinking density of the polymer layer 3 and reduce the rubbing resistance of the antifouling film 1. When the polymerizable composition contains multiple kinds of monofunctional amide monomers, the total amount of the multiple kinds of monofunctional amide monomers is preferably within the above range in terms of active components.

Examples of the monofunctional amide monomer include N-acryloylmorpholine, N,N-dimethylacrylamide, N,N-diethylacrylamide, N-(2-hydroxyethyl)acrylamide, diacetone acrylamide, and N-n-butoxymethylacrylamide.

Known examples of the N-acryloylmorpholine include "ACMO®" from KJ Chemicals Corp. Known examples of the N,N-dimethylacrylamide include "DMAA®" from KJ Chemicals Corp. Known examples of the N,N-diethylacrylamide include "DEAA®" from KJ Chemicals Corp. Known examples of the N-(2-hydroxyethyl)acrylamide include "HEAA®" from KJ Chemicals Corp. Known examples of the diacetone acrylamide include "DAAM®" from Nippon Kasei Chemical Co., Ltd. Known examples of the N-n-butoxymethylacrylamide include "NBMA" from MRC Unitec Co., Ltd.

(Urethane Acrylate (S))

The urethane acrylate (S) is a urethane acrylate containing a fluorine atom and an ester bond, that is, one of fluorine-based compounds. The ester bond in the urethane acrylate (S) is an ester bond derived from an isocyanate component containing an acryloyloxy group or an ester bond derived from an acrylate component containing an active hydrogen atom. The acryloyl group in the urethane acrylate (S) functions as a polymerizable functional group that reacts with a different component by external energy such as light or heat.

The presence of the urethane acrylate (S) in the polymerizable composition allows concentration of fluorine atoms derived from the urethane acrylate (S) on the surface (the surface remote from the substrate 2) of the polymer layer 3 and reduces the surface free energy of the polymer layer 3, which increases the antifouling properties of the antifouling film 1. The urethane acrylate (S) has a low molecular weight and low affinity with an ethylene oxide group, and thus tends to move to the surface (the surface remote from the substrate 2) of the polymer layer 3. Accordingly, the antifouling properties of the antifouling film 1 tend to be increased even with a small amount of the urethane acrylate (S). In addition, the acryloyl groups in the urethane acrylate (S) crosslink in the polymer layer 3, which imparts long-term high antifouling properties to the antifouling film 1. Furthermore, the urethane acrylate (S), containing a strong ester bond, tends to increase the rubbing resistance of the antifouling film 1.

The urethane acrylate (S) has a weight average molecular weight determined by gel permeation chromatography (GPC) and calibrated with polystyrene standards of preferably 100 to 100000, more preferably 200 to 20000, still more preferably 300 to 2000. A urethane acrylate (S) having a weight average molecular weight of lower than 100 may penetrate the polymer layer 3 by the flip-flop effect, which may fail to impart long-term high antifouling properties to the antifouling film 1. A urethane acrylate (S) having a weight average molecular weight of higher than 100000 is less likely to concentrate on the surface (the surface remote from the substrate 2) of the polymer layer 3, which may fail to impart long-term high antifouling properties to the antifouling film 1.

The polymerizable composition contains 2.5 to 12.5 wt %, preferably 3.5 to 10 wt %, of the urethane acrylate (S) in terms of active components. A polymerizable composition having a urethane acrylate (S) content of lower than 2.5 wt % in terms of active components reduces the number of fluorine atoms that concentrate on the surface (the surface remote from the substrate 2) of the polymer layer 3, reducing the antifouling properties of the antifouling film 1. A polymerizable composition having a urethane acrylate (S) content of higher than 12.5 wt % in terms of active components reduces the compatibility of the urethane acrylate (S) with other component(s) in the polymerizable composition, which results in reduced transparency (whitening) of the antifouling film 1 (polymer layer 3). When the polymerizable composition contains multiple kinds of urethane acrylates (S), the total amount of multiple kinds of urethane acrylates (S) is 2.5 to 12.5 wt % in terms of active components.

Known examples of the urethane acrylate (S) include "EBECRYL® 8110" available from Daicel-Allnex Ltd. and "Megaface® RS-75" available from DIC Corporation, as disclosed in JP 2015-138150 A. Each of these fluorine-based compounds is one of perfluoroalkyl-based oligomers. The "perfluoroalkyl-based oligomer" herein means a fluorine-based oligomer containing a perfluoroalkyl group.

Differently from the present embodiment, if the polymerizable composition contains not the urethane acrylate (S) but a fluorine-containing polyether-based urethane acrylate, for example, the resulting antifouling film 1 fails to have long-term high antifouling properties. Known examples of the fluorine-containing polyether-based urethane acrylate include "Ftergent® 602A" available from Neos Co., Ltd. as disclosed in JP 2015-138150 A. Similarly to the known examples of the urethane acrylate (S), this fluorine-based compound is also one of perfluoroalkyl-based oligomers, but is inferior to the known examples in imparting long-term high antifouling properties to the antifouling film 1.

(Perfluoroalkyl-Based Monomer (T))

The perfluoroalkyl-based monomer (T) is a perfluoroalkyl-based monomer containing one (meth)acryloyl group for each molecule, that is, one of fluorine-based compounds. The "perfluoroalkyl-based monomer" herein means a fluorine-based monomer containing a perfluoroalkyl group. The (meth)acryloyl group in the perfluoroalkyl-based monomer (T) functions as a polymerizable functional group that reacts with a different component(s) by external energy such as light or heat.

The presence of the perfluoroalkyl-based monomer (T) in the polymerizable composition allows concentration of fluorine atoms derived from the perfluoroalkyl-based monomer (T) on the surface (the surface remote from the substrate 2) of the polymer layer 3 and reduces the surface free energy of the polymer layer 3, which increases the antifouling properties of the antifouling film 1. The perfluoroalkyl-based monomer (T) has a low molecular weight, and thus tends to move to the surface (the surface remote from the substrate 2) of the polymer layer 3. Accordingly, the antifouling properties of the antifouling film 1 tend to be increased even with a small amount of the perfluoroalkyl-based monomer (T). In addition, the acryloyl groups in the perfluoroalkyl-based monomer (T) crosslink in the polymerizable composition, which imparts long-term high antifouling properties to the antifouling film 1.

If the polymerizable composition contains not the perfluoroalkyl-based monomer (T) but a perfluoroalkyl-based monomer containing two or more (meth)acryloyl groups for each molecule, the high molecular weight of the perfluoroalkyl-based monomer containing two or more (meth)acryloyl groups for each molecule reduces the compatibility with other component(s) in the polymerizable composition, which results in reduced transparency (whitening) of the antifouling film 1 (polymer layer 3). Furthermore, the perfluoroalkyl-based monomer containing two or more (meth) acryloyl groups for each molecule, which forms a main skeleton or a branch in the polymer layer 3 and tends to be taken into a crosslink structure, is less likely to concentrate on the surface (the surface remote from the substrate 2) of the polymer layer 3 than the perfluoroalkyl-based monomer (T).

The perfluoroalkyl-based monomer (T) has a fluorine atom concentration of 50 to 60 wt %, preferably 52 to 60 wt %. A perfluoroalkyl-based monomer (T) having a fluorine atom concentration of lower than 50 wt % reduces the number of fluorine atoms that concentrate on the surface (the surface remote from the substrate 2) of the polymer layer 3, reducing the antifouling properties of the antifouling film 1. A perfluoroalkyl-based monomer (T) having a fluorine atom concentration of higher than 60 wt % softens the polymer layer 3 and thereby reduces the rubbing resistance, and also has reduced compatibility of the perfluoroalkyl-based monomer (T) with other component(s) in the polymerizable composition and thereby causes reduced transparency (whitening) of the antifouling film 1 (polymer layer 3).

The polymerizable composition contains 2.5 to 9 wt %, preferably 3 to 7 wt %, of the perfluoroalkyl-based monomer (T) in terms of active components. A polymerizable composition having a perfluoroalkyl-based monomer (T) content of lower than 2.5 wt % in terms of active components reduces the number of fluorine atoms that concentrate on the surface (the surface remote from the substrate 2) of the polymer layer 3, reducing the antifouling properties of the antifouling film 1. A polymerizable composition having a perfluoroalkyl-based monomer (T) content of higher than 9 wt % in terms of active components reduces the compatibility with other component(s) in the polymerizable composition, which results in reduced transparency (whitening) of the antifouling film 1 (polymer layer 3). When the polymerizable composition contains multiple kinds of perfluoroalkyl-based monomers (T), the total amount of multiple kinds of perfluoroalkyl-based monomers (T) is 2.5 to 9 wt % in terms of active components.

Examples of the perfluoroalkyl-based monomer (T) include 2-(perfluorohexyl)ethyl acrylate, 2-(perfluorobutyl) ethyl acrylate, 2-(perfluorohexyl)ethyl methacrylate, 2-(perfluorobutyl)ethyl methacrylate, 1H,1H,5H-octafluoropentyl acrylate, and 1H,1H,5H-octafluoropentyl methacrylate.

Known examples of the 2-(perfluorohexyl)ethyl acrylate include "CHEMINOX® FAAC-6" available from Unimatec Corporation. Known examples of the 2-(perfluorobutyl) ethyl acrylate include "CHEMINOX FAAC-4" available from Unimatec Corporation. Known examples of the 2-(perfluorohexyl)ethyl methacrylate include "CHEMINOX FAMAC-6" available from Unimatec Corporation. Known examples of the 2-(perfluorobutyl)ethyl methacrylate include "CHEMINOX FAMAC-4" available from Unimatec Corporation. Known examples of the 1H,1H,5H-octafluoropentyl acrylate include "Viscoat 8F" available from Osaka Organic Chemical Industry Ltd. Known examples of the 1H,1H,5H-octafluoropentyl methacrylate include "Viscoat 8FM" available from Osaka Organic Chemical Industry Ltd.

The polymerizable composition has an ethylene oxide group concentration of 20 to 50 wt %, preferably 25 to 45 wt %, more preferably 30 to 40 wt %. A polymerizable composition having an ethylene oxide group concentration of lower than 20 wt % increases the crosslinking density of the polymer layer 3 and reduces the polarity of the polymer layer 3, which inhibits concentration of fluorine atoms in the fluorine-based compounds on the surface (the surface remote from the substrate 2) of the polymer layer 3 and fails to impart long-term high antifouling properties to the antifouling film 1. A polymerizable composition having an ethylene oxide group concentration of higher than 50 wt % reduces the solubility of the fluorine-based compounds in the polymerizable composition, which results in reduced transparency (whitening) of the antifouling film 1 (polymer layer 3).

In the present embodiment, the polymerizable composition constituting the polymer layer 3 contains the urethane acrylate (S) and the perfluoroalkyl-based monomer (T) as fluorine-based compounds and has an ethylene oxide group concentration within the predetermined range. Therefore, more fluorine atoms concentrate on the surface (the surface remote from the substrate 2) of the polymer layer 3, which tends to impart long-term high antifouling properties to the antifouling film 1.

The polymerizable composition contains at least the urethane acrylate (S) and the perfluoroalkyl-based monomer (T) as fluorine-based compounds, and may further contain a perfluoropolyether-based oligomer. The "perfluoropolyether-based oligomer" herein means a fluorine-based oligomer containing a perfluoropolyether group.

Known examples of the perfluoropolyether-based oligomer include "Fomblin® MT70" available from Solvay Japan, Ltd. and "X-27-1203E" available from Shin-Etsu Chemical Co., Ltd.

Differently from the present embodiment, if the polymerizable composition contains not the urethane acrylate (S) but a perfluoropolyether-based oligomer, for example, the resulting antifouling film 1 fails to have long-term high antifouling properties. The perfluoropolyether-based oligomer, containing a perfluoropolyether group, has high affinity with hexadecane and artificial contamination liquids, which are often used as assumed contaminants in evaluation for antifouling properties. Thus, if a large amount of the perfluoropolyether-based oligomer concentrates on the surface (the surface remote from the substrate 2) of the polymer layer 3, hexadecane or an artificial contamination liquid stuck on the surface significantly spread in a wet state with time. In other words, the antifouling film 1 fails to have long-term high antifouling properties.

The polymerizable composition may further contain a block copolymer containing a fluorine segment and a non-fluorine segment. The "fluorine segment" herein means a cured product (polymer) of a monomer mainly containing a fluorine-based monomer. The fluorine-based monomer may be any radically polymerizable monomer containing a fluorine atom. The "non-fluorine segment" herein means a cured product (polymer) of a monomer mainly containing a non-fluorine-based monomer. The non-fluorine-based monomer may be any radically polymerizable monomer containing no fluorine atom.

The presence of the block copolymer in the polymerizable composition allows the non-fluorine segment to function as a compatible segment having compatibility with other component(s) in the polymerizable composition and allows concentration of the fluorine segment (fluorine atoms derived from the fluorine segment) on the surface (the surface remote from the substrate 2) of the polymer layer 3. This reduces the surface free energy of the polymer layer 3 and sufficiently increases the antifouling properties of the antifouling film 1. The block copolymer tends to be fixed in the polymer layer 3 by the compatible-segment function of the non-fluorine segment, which tends to impart long-term high antifouling properties to the antifouling film 1.

The block copolymer contains preferably 10 to 90 wt %, more preferably 35 to 65 wt %, of the fluorine segment. A block copolymer containing lower than 10 wt % of the fluorine segment may fail to achieve sufficient properties as the fluorine segment, i.e., sufficient antifouling properties. A block copolymer containing higher than 90 wt % of the fluorine segment may reduce the compatibility with other component(s) in the polymerizable composition, which may result in reduced transparency (whitening) of the antifouling film 1 (polymer layer 3).

The block copolymer has a number average molecular weight of preferably 5000 to 1000000, more preferably 10000 to 300000, still more preferably 10000 to 100000. A block copolymer having a number average molecular weight of lower than 5000 may provide a short fluorine segment and may fail to impart sufficient properties, i.e., sufficient antifouling properties of the fluorine segment. A block copolymer having a number average molecular weight of higher than 1000000 may reduce the compatibility of the block copolymer with other component(s) in the polymerizable composition, which may result in reduced transparency (whitening) of the antifouling film 1 (polymer layer 3).

The block copolymer is preferably a perfluoroalkyl-based copolymer. The "perfluoroalkyl-based copolymer" herein means a fluorine-based copolymer containing a perfluoroalkyl group. When the block copolymer is a perfluoroalkyl-based copolymer, the fluorine segment tends to concentrate on the surface (the surface remote from the substrate 2) of the polymer layer 3 (rigid molecular chains tend to align in a rising state). Thus, fluorine atoms tend to be densely distributed on the surface (the surface remote from the substrate 2) of the polymer layer 3, which tends to increase the antifouling properties of the antifouling film 1.

The block copolymer may not contain a (meth)acryloyl group functioning as a polymerizable functional group. Since the block copolymer contains the non-fluorine segment having compatibility with other component(s) in the polymerizable composition, even a block copolymer containing no (meth)acryloyl group as a polymerizable functional group tends to be fixed in the polymer layer 3.

The polymerizable composition contains 0.1 to 5 wt %, preferably 0.5 to 3 wt %, of the block copolymer in terms of active components. A polymerizable composition having a block copolymer content of lower than 0.1 wt % in terms of active components may reduce the number of fluorine atoms that concentrate on the surface (the surface remote from the substrate 2) of the polymer layer 3 and may fail to sufficiently increase the antifouling properties of the antifouling film 1. A polymerizable composition having a block copolymer content of higher than 5 wt % in terms of active components may reduce the compatibility with other component(s) in the polymerizable composition, which may result in reduced transparency (whitening) of the antifouling film 1 (polymer layer 3). When the polymerizable composition contains multiple kinds of block copolymers, the total amount of the multiple kinds of block copolymers is preferably within the above range in terms of active components.

Known examples of the block copolymer include "Modiper® F606", "Modiper F206", and "Modiper F3636", all available from NOF Corporation.

The polymerizable composition may further contain a polymerization initiator. Use of the polymerization initiator in the polymerizable composition increases the curability of the polymerizable composition.

Examples of the polymerization initiator include photopolymerization initiators and thermal polymerization initiators, with the photopolymerization initiators preferred. The photopolymerization initiators are active to active energy rays.

The polymerizable composition preferably contains 1 to 3 wt % of the photopolymerization initiator in terms of active components. When the polymerizable composition contains multiple kinds of photopolymerization initiators, the total amount of the multiple kinds of photopolymerization initiators is preferably within the above range in terms of active components.

Examples of the photopolymerization initiator include radical polymerization initiators, anionic polymerization initiators, and cationic polymerization initiators. Examples of such a photopolymerization initiator include acetophenone-based photopolymerization initiators such as p-tert-butyl-trichloroacetophenone, 2,2'-diethoxyacetophenone, and 2-hydroxy-2-methyl-1-phenylpropan-1-one; ketone-based photopolymerization initiators such as benzophenone, 4,4'-bisdimethylaminobenzophenone, 2-chlorothioxanthone, 2-methylthioxanthone, 2-ethylthioxanthone, and 2-isopropylthioxanthone; benzoin ether-based photopolymerization initiators such as benzoin, benzoin methyl ether, benzoin isopropyl ether, and benzoin isobutyl ether; benzyl ketal-based photopolymerization initiators such as benzyl dimethyl ketal and hydroxycyclohexyl phenyl ketone; acylphosphine oxide-based photopolymerization initiators such as bis(2,4,6-trimethylbenzoyl)-phenyl phosphine oxide and diphenyl(2,4,6-trimethoxybenzoyl)phosphine oxide; and alkylphenone-based photopolymerization initiators such as 1-hydroxy-cyclohexyl-phenyl-ketone.

The photopolymerization initiator preferably contains an acylphosphine oxide-based photopolymerization initiator and an alkylphenone-based photopolymerization initiator. Use of both the acylphosphine oxide-based photopolymerization initiator and the alkylphenone-based photopolymerization initiator as the photopolymerization initiators significantly increases the curability of the polymerizable composition and promotes curing (significantly reduces uncured part) of the entire polymer layer 3 (including the surface close to the substrate 2 and the surface remote from the substrate 2), which resultantly allows easy concentration of fluorine atoms in the fluorine-based compounds on the surface (the surface remote from the substrate 2) of the polymer layer 3.

The polymerizable composition preferably contains 0.5 to 1.5 wt % of the acylphosphine oxide-based photopolymerization initiator in terms of active components. When the polymerizable composition contains multiple kinds of acylphosphine oxide-based photopolymerization initiators, the total amount of the multiple kinds of acylphosphine oxide-based photopolymerization initiators is preferably within the above range in terms of active components.

Concerning the acylphosphine oxide-based photopolymerization initiator, known examples of the bis(2,4,6-trimethylbenzoyl)-phenylphosphine oxide include "Omnirad® 819" available from IGM Resins B.V. Known examples of the diphenyl(2,4,6-trimethoxybenzoyl)phosphine oxide include "Omnirad TPO" available from IGM Resins B.V.

The polymerizable composition preferably contains 0.5 to 1.5 wt % of the alkylphenone-based photopolymerization initiator in terms of active components. When the polymerizable composition contains multiple kinds of alkylphenone-based photopolymerization initiators, the total amount of the multiple kinds of alkylphenone-based photopolymerization initiators is preferably within the above range in terms of active components.

Concerning the alkylphenone-based photopolymerization initiator, known examples of the 1-hydroxy-cyclohexyl-phenyl-ketone include "Omnirad 184" available from IGM Resins B.V.

The polymerizable composition may further contain a solvent. In this case, the solvent may be present together with active components in any of the components, or may be present separately from the components.

Examples of the solvent include alcohols (C1-C10 alcohols such as methanol, ethanol, n- or i-propanol, n-, sec-, or t-butanol, benzyl alcohol, and octanol), ketones (C3-C8 ketones such as acetone, methyl ethyl ketone, methyl isobutyl ketone, diisobutyl ketone, dibutyl ketone, and cyclohexanone), esters or ether esters (C4-C10 esters such as ethyl acetate, butyl acetate, and ethyl lactate), γ-butyrolactone, ethylene glycol monomethyl acetate, propylene glycol monomethyl acetate, ethers (C4-C10 ethers such as EG monomethyl ether (methyl cellosolve), EG monomethyl ether (ethyl cellosolve), diethylene glycol monobutyl ether (butyl cellosolve), and propylene glycol monomethyl ether), aromatic hydrocarbons (C6-C10 aromatic hydrocarbons such as benzene, toluene, and xylene), amides (C3-C10 amides such as dimethylformamide, dimethylacetamide, and N-methylpyrrolidone), halogenated hydrocarbons (C1-C2 halogenated hydrocarbons such as methylene dichloride and ethylene dichloride), and petroleum-based solvents (e.g., petroleum ether, petroleum naphtha).

In terms of the antifouling properties, the polymer layer 3 preferably has a surface (surface remote from the substrate 2) that shows a contact angle with hexadecane of 30° or greater, more preferably 70° or greater, still more preferably 90° or greater.

The antifouling film 1 may be used in any way that utilizes the excellent antifouling properties, and may be used as, for example, an optical film such as an antireflective film. Such an antireflective film contributes to an increase in visibility when it is mounted inside or outside a display device.

The antifouling properties of the antifouling film 1 may mean that dirt adhering to the surface (the surface remote from the substrate 2) of the polymer layer 3 is easily removable, or that dirt is not likely to adhere to the surface (the surface remote from the substrate 2) of the polymer layer 3. The antifouling film 1, owing to the lotus effect provided by its moth-eye structure, can achieve better antifouling properties than a conventional antifouling film (e.g., fluorine-containing film) having a normal surface such as a flat surface.

The antifouling film 1 may be produced by the following production method, for example. FIG. 3A, FIG. 3B, FIG. 3C, FIG. 3D, and FIG. 3E are schematic cross-sectional views illustrating an exemplary method for producing the antifouling film of the embodiment.

(A) Release Treatment of Die

As shown in FIG. 3A, a release agent 7 is applied to the surface of a die 5.

Examples of techniques of applying the release agent 7 include spray coating, gravure coating, slot-die coating, bar coating, and potting.

(B) Application of Polymerizable Composition

Figure 3B:
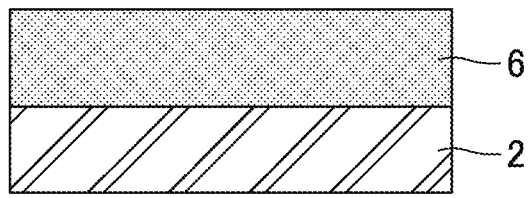
FIG. 3B is a schematic cross-sectional view illustrating the exemplary method for producing the antifouling film of the embodiment.

As shown in FIG. 3B, a polymerizable composition 6 is applied to a surface of the substrate 2.

Examples of techniques of applying the polymerizable composition 6 include spray coating, gravure coating, slot-die coating, and bar coating. Among these, gravure coating or slot-die coating is preferred in order to level the thickness of the resulting film and to achieve good productivity.

The polymerizable composition 6 contains, in terms of active components, 75 to 95 wt % of the polymerizable monomer (R), 2.5 to 12.5 wt % of the urethane acrylate (S), and 2.5 to 9 wt % of the perfluoroalkyl-based monomer (T), and has an ethylene oxide group concentration of 20 to 50 wt %. When the polymerizable composition 6 further contains a solvent, heating (drying) may be performed to remove the solvent after application of the polymerizable composition 6. The heating is preferably performed at a temperature equal to or higher than the boiling point of the solvent.

The above processes (A) and (B) may be performed at the same timing or at different timings.

(C) Formation of Uneven Structure

Figure 3C:
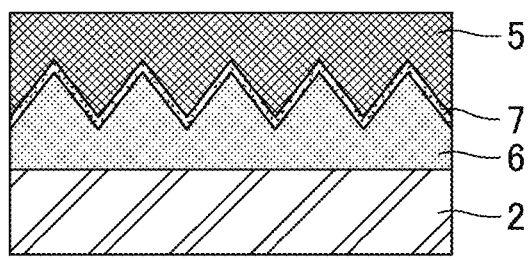
FIG. 3C is a schematic cross-sectional view illustrating the exemplary method for producing the antifouling film of the embodiment.

The substrate 2 is pushed to the surface coated with the release agent 7 of the die 5 with the polymerizable composition 6 in between. As a result, an uneven structure is formed on the surface (the surface remote from the substrate 2) of the polymerizable composition 6 as shown in FIG. 3C.

(D) Formation of Polymer Layer

Figure 3D:
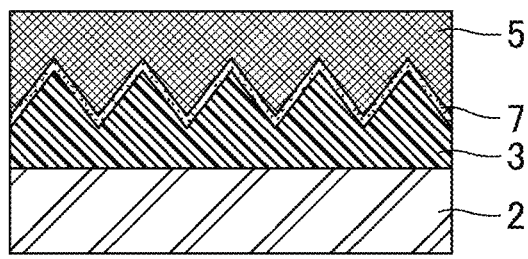
FIG. 3D is a schematic cross-sectional view illustrating the exemplary method for producing the antifouling film of the embodiment.

The polymerizable composition 6 is cured. As a result, the polymer layer 3 is formed as shown in FIG. 3D.

Curing of the polymerizable composition 6 is achieved by, for example, application of active energy rays or heating. The polymerizable composition 6 is cured preferably by application of active energy rays, more preferably by application of ultraviolet rays. Application of active energy rays may be performed from the substrate 2 side of the polymerizable composition 6, or may be performed from the die 5 side of the polymerizable composition 6. Application of active energy rays to the polymerizable composition 6 may be performed once or multiple times.

The above processes (C) and (D) may be performed at the same timing or at different timings.

(E) Die Removal

Figure 3E:
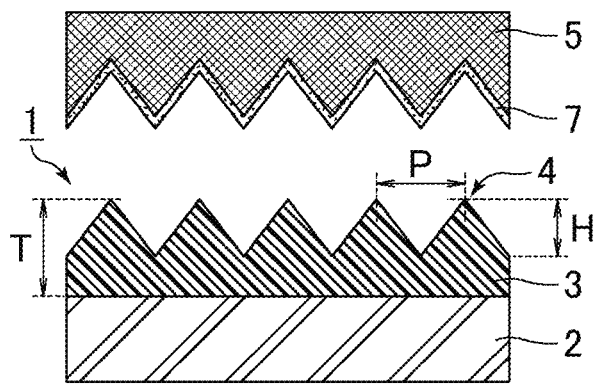
FIG. 3E is a schematic cross-sectional view illustrating the exemplary method for producing the antifouling film of the embodiment.

As shown in FIG. 3E, the die 5 is removed from the polymer layer 3.

After the die 5 is removed from the polymer layer 3, the polymer layer 3 may be irradiated with active energy rays (e.g., ultraviolet rays) from the side remote from the substrate 2. Irradiation with active energy rays after the removal of the die 5 as well as before the removal of the die 5 (in the process (D)) promotes curing (significantly reduces uncured part) of the entire polymer layer 3 (including the surface close to the substrate 2 and the surface remote from the substrate 2), which resultantly allows easy concentration of fluorine atoms in the fluorine-based compounds on the surface (the surface remote from the substrate 2) of the polymer layer 3.

A specific case for easily achieving such effects is described below in which the polymerizable composition 6 contains an acylphosphine oxide-based photopolymerization initiator and an alkylphenone-based photopolymerization initiator and the substrate 2 is a triacetyl cellulose film.

First, when the polymerizable composition 6 is irradiated with ultraviolet rays from the substrate 2 side before the removal of the die 5 (in the process (D)), the acylphosphine oxide-based photopolymerization initiator more promotes curing reaction of the polymerizable composition 6 on the substrate 2 side. This is due to the following reasons 1 and 2.

(Reason 1) An acylphosphine oxide-based photopolymerization initiator absorbs ultraviolet rays within a wavelength range (e.g., about 450 nm or shorter for "Omnirad 819" available from IGM Resins B.V.) that is wider than and encompasses the wavelength range (about 380 nm or shorter) of ultraviolet rays absorbed by a triacetyl cellulose film. In other words, ultraviolet rays having passed through a triacetyl cellulose film without being absorbed can be absorbed by an acylphosphine oxide-based photopolymerization initiator.

(Reason 2) An alkylphenone-based photopolymerization initiator absorbs ultraviolet rays within a wavelength range (e.g., about 380 nm or shorter for "Omnirad 184" available from IGM Resins B.V.) that is encompassed by the wavelength range of ultraviolet rays absorbed by a triacetyl cellulose film (about 380 nm or shorter). In other words, ultraviolet rays having passed through a triacetyl cellulose film without being absorbed is not absorbed by an alkylphenone-based photopolymerization initiator.

Next, when the polymer layer 3 is irradiated with ultraviolet rays from the side remote from the substrate 2 after the removal of the die 5 (in the process (E)), the alkylphenone-based photopolymerization initiator more promotes curing reaction of uncured part in the polymer layer 3 on the side remote from the substrate 2.

As described, irradiation of active energy rays before and after the removal of the die 5 (in the processes (D) and (E)) promotes curing (significantly reduces uncured part) of the entire polymer layer 3 (including the surface close to the substrate 2 and the surface remote from the substrate 2), which resultantly allows easy concentration of fluorine atoms in the fluorine-based compounds on the surface (the surface remote from the substrate 2) of the polymer layer 3.

The above processes (A) to (E) complete the antifouling film 1. A series of processes such as a series of the processes (B) to (E) herein is also referred to as "die transferring". In the present production example, when the antifouling film 1 is continuously produced, the process (A) may be performed at least once at an initial stage (before first transferring), and then the processes (B) to (E) may be repeated. Specifically, the process (A) may be skipped at the second or after transferring: for example, the processes may be performed in the order of (A), (B), (C), (D), (E), (B), (C), (D), (E), (B), (C), (D), (E), and the like. The process (A) may be performed again appropriately at the second or after transferring: for example, the processes may be performed in the order of (A), (B), (C), (D), (E), (B), (C), (D), (E), (A), (B), (C), (D), (E), and the like (in this case, the process (A) is performed again at the third transferring). In such die transferring, the substrate 2 in the form of a roll, for example, enables continuous and efficient performing of the processes (B) to (E).

<Die>

The die 5 may be one produced by the following method. First, a film of aluminum as a material of the die 5 is formed on a surface of a support by sputtering. Next, the resulting aluminum layer is repetitively subjected to anodizing and etching. Thereby, a cavity (die 5) of the moth-eye structure can be produced. At this time, the uneven structure of the die 5 can be modified by adjusting the duration of the anodizing and the duration of the etching.

Examples of the material of the support include glass; metals such as stainless steel and nickel; polyolefinic resins such as polypropylene, polymethylpentene, and cyclic olefinic polymers (typified by norbornene-based resin, e.g., "Zeonor®" from Zeon Corp., "Arton®" from JSR Corp.); polycarbonate resin; and resins such as polyethylene terephthalate, polyethylene naphthalate, and triacetyl cellulose. Instead of the support with an aluminum film formed on the surface, an aluminum support may be used.

The die 5 may be in the form of a flat plate or a roll, for example.

<Release Agent>

The release agent 7 is used for release treatment on the surface of the die 5. The release agent 7 increases the release properties (e.g., water repellency) of the die 5. Thus, the die 5 can be easily removed from the polymer layer 3. Further, this treatment makes the surface free energy of the die 5 low, and thus fluorine atoms in the fluorine-based compounds added to the polymerizable composition 6 can uniformly be distributed on the surface (the surface remote from the substrate 2) of the polymerizable composition 6 when the substrate 2 is pushed to the die 5. Further, this treatment can prevent early removal of the fluorine atoms from the surface (the surface remote from the substrate 2) of the polymerizable composition 6 before curing of the polymerizable composition 6. As a result, in the antifouling film 1, the fluorine atoms can uniformly be distributed on the surface (the surface remote from the substrate 2) of the polymer layer 3.

Examples of the release agent 7 include fluorine-based release agents, silicone-based release agents, and phosphate-ester-based release agents, with the fluorine-based release agents preferred. Preferred among the fluorine-based release agents are perfluoropolyether-based release agents. Known examples thereof include "Optool® DSX", "Optool UD509", and "Optool AES4" from Daikin Industries, Ltd.

EXAMPLES AND COMPARATIVE EXAMPLES

The present invention is described in more detail based on the following examples and comparative examples. The examples, however, are not intended to limit the scope of the present invention.

The materials used in production of the antifouling films in the examples and comparative examples were as follows.

<Substrate>

"TAC-TD80U" from Fujifilm Corp. was used. The thickness thereof was 80 μm.

<Die>

A die produced by the following method was used. First, a film of aluminum as a material of the die was formed on a 10-cm-square glass substrate by sputtering. The thickness of the resulting aluminum layer was 1.0 μm. Next, the resulting aluminum layer was repetitively subjected to anodizing and etching. Thereby, an anodized layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed in the stated order (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation.

<Release Agent>

"Optool UD509" from Daikin Industries, Ltd. was used. The active component concentration thereof was 0.001 wt %.

<Polymerizable Composition>

Polymerizable compositions A1 to A18 and B1 to B16 having the respective compositions (amounts of active components) shown in Tables 1 to 8 were used. The abbreviations of the respective components are as follows.

(Bifunctional Acrylate (R1))
"M282"
"MIRAMER M282" available from Miwon Specialty Chemical Co., Ltd.
Active component concentration: 100 wt %
Number of functional groups: 2
Number of ethylene oxide groups: 4 for each molecule
"M280"
"MIRAMER M280" available from Miwon Specialty Chemical Co., Ltd.
Active component concentration: 100 wt %
Number of functional groups: 2
Number of ethylene oxide groups: 9 for each molecule
(Multifunctional Acrylate (R2))
"M300"
"MIRAMER M300" available from Miwon Specialty Chemical Co., Ltd.
Active component concentration: 100 wt %
Number of functional groups: 3
Number of ethylene oxide groups: 0 for each molecule
"M600"
"MIRAMER M600" available from Miwon Specialty Chemical Co., Ltd.
Active component concentration: 100 wt %
Number of functional groups: 6
Number of ethylene oxide groups: 0 for each molecule
"U-10"
"U-10HA" available from Shin-Nakamura Chemical Co., Ltd.
Active component concentration: 100 wt %
Number of functional groups: 10
Number of ethylene oxide groups: 0 for each molecule
(Multifunctional Acrylate Other than Bifunctional Acrylate (R1) and Multifunctional Acrylate (R2))
"5027E"
"NK Economer® A-PG5027E" available from Shin-Nakamura Chemical Co., Ltd.
Active component concentration: 100 wt %
Number of functional groups: 9
Number of ethylene oxide groups: 27 for each molecule
(Monofunctional Amide Monomer)
"AC"
"ACMO" available from KJ Chemicals Corporation
Active component concentration: 100 wt %
(Reactive Diluent)
"E8110R"
Reactive diluent (active components) derived from "EBECRYL 8110" available from Daicel-Allnex Ltd.
Concentration in "EBECRYL 8110": about 50 wt %
(Urethane Acrylate (S))
"E8110"
Fluorine-based compound (active components) derived from "EBECRYL 8110" available from Daicel-Allnex Ltd.
Concentration in "EBECRYL 8110": about 50 wt %
"RS-75"
"Megaface RS-75" available from DIC Corporation
Active component concentration: 40 wt %

(Fluorine-Containing Urethane Acrylate Other than Urethane Acrylate (S): Fluorine-Containing Polyether-Based Urethane Acrylate)
"602A"
"Ftergent 602A" available from Neos Co., Ltd.
Active component concentration: about 50 wt %
(Perfluoroalkyl-Based Monomer (T))
"FAAC-6"
"CHEMINOX FAAC-6" available from Unimatec Corporation
Active component concentration: 100 wt %
Fluorine atom concentration: 59.1 wt %
"FAAC-4"
"CHEMINOX FAAC-4" available from Unimatec Corporation
Active component concentration: 100 wt %
Fluorine atom concentration: 53.7 wt %
"V8FM"
"Viscoat 8FM" available from Osaka Organic Chemical Industry Ltd.
Active component concentration: 100 wt %
Fluorine atom concentration: 50.7 wt %
(Perfluoroalkyl-Based Monomer Other than Perfluoroalkyl-Based Monomer (T))
"V4F"
"Viscoat 4F" available from Osaka Organic Chemical Industry Ltd.
Active component concentration: 100 wt %
Fluorine atom concentration: 40.9 wt %
"C10A"
"C10ACRY" available from Exfluor Research Corporation
Active component concentration: 100 wt %
Fluorine atom concentration: 65.2 wt %
(Block Copolymer)
"F606"
"Modiper F606" available from NOF Corporation
Active component concentration: 100 wt %
Perfluoroalkyl group: present
(Meth)acryloyl group: absent
(Perfluoropolyether-Based Oligomer)
"MT70"
"Fomblin MT70" available from Solvay Japan, Ltd.
Active component concentration: 80 wt %
"1203E"
"X-27-1203E" available from Shin-Etsu Chemical Co., Ltd.
Active component concentration: 20 wt %
(Polymerization Initiator)
"819"
"Omnirad 819" available from IGM Resins B.V.
Active component concentration: 100 wt %
"TPO"
"Omnirad TPO" available from IGM Resins B.V.
Active component concentration: 100 wt %
"184"
"Omnirad 184" available from IGM Resins B.V.
Active component concentration: 100 wt %

TABLE 1

| | | Component | Abbreviation | Polymerizable composition | | | | |
| --- | --- | --- | --- | --- | --- | --- | --- | --- |
| | | | | A1 | A2 | A3 | A4 | A5 |
| Amount (parts by weight) | Polymerizable monomer (R) | Bifunctional acrylate (R1) | M282 | 75.0 | 75.0 | 75.0 | 75.0 | 70.0 |
| | | | M280 | — | — | — | — | — |
| | | Multifunctional acrylate (R2) | M300 | 15.0 | 15.0 | 15.0 | 15.0 | 15.0 |
| | | | M600 | — | — | — | — | — |
| | | | U-10 | — | — | — | — | — |

TABLE 1-continued

|  |  | Component | Abbreviation | Polymerizable composition | | | | |
|---|---|---|---|---|---|---|---|---|
|  |  |  |  | A1 | A2 | A3 | A4 | A5 |
|  |  | Multifunctional acrylate other than (R1) and (R2) | 5027E | — | — | — | — | — |
|  |  | Monofunctional amide monomer | AC | 10.0 | 10.0 | 10.0 | 10.0 | 15.0 |
|  |  | Reactive diluent | E8110R | 4.0 | — | 4.0 | 4.0 | — |
|  | Fluorine-based compound | Urethane acrylate (S) | E8110 | 4.0 | — | 4.0 | 4.0 | — |
|  |  |  | RS-75 | — | 4.0 | — | — | 15.0 |
|  |  | Fluorine-containing urethane acrylate other than (S) | 602A | — | — | — | — | — |
|  |  | Perfluoroalkyl-based monomer (T) | FAAC-6 | 4.0 | 4.0 | — | — | 4.0 |
|  |  |  | FAAC-4 | — | — | 6.0 | — | — |
|  |  |  | V8FM | — | — | — | — | — |
|  |  | Perfluoroalkyl-based monomer other than (T) | V4F | — | — | — | — | — |
|  |  |  | C10A | — | — | — | — | — |
|  |  | Block copolymer | F606 | — | — | — | — | — |
|  |  | Perfluoropolyether-based oligomer | MT70 | — | — | — | — | — |
|  |  |  | 1203E | — | — | — | — | — |
|  | Polymerization initiator | Acylphosphine oxide-based photopolymerization initiator | 819 | 1.5 | 1.5 | 1.5 | 1.5 | 1.5 |
|  |  |  | TPO | — | — | — | — | — |
|  |  | Alkylphenone-based photopolymerization initiator | 184 | 1.5 | 1.5 | 1.5 | 1.5 | 1.5 |

TABLE 2

|  |  | Component | Abbreviation | Polymerizable composition | | | | |
|---|---|---|---|---|---|---|---|---|
|  |  |  |  | A6 | A7 | A8 | A9 | A10 |
| Amount (parts by weight) | Polymerizable monomer (R) | Bifunctional acrylate (R1) | M282 | 75.0 | 75.0 | 75.0 | 75.0 | 75.0 |
|  |  |  | M280 | — | — | — | — | — |
|  |  | Multifunctional acrylate (R2) | M300 | 15.0 | 15.0 | 15.0 | 15.0 | 15.0 |
|  |  |  | M600 | — | — | — | — | — |
|  |  |  | U-10 | — | — | — | — | — |
|  |  | Multifunctional acrylate other than (R1) and (R2) | 5027E | — | — | — | — | — |
|  |  | Monofunctional amide monomer | AC | 10.0 | 10.0 | 10.0 | 10.0 | 10.0 |
|  |  | Reactive diluent | E8110R | — | 4.0 | 4.0 | 4.0 | 4.0 |
|  | Fluorine-based compound | Urethane acrylate (S) | E8110 | — | 4.0 | 4.0 | 4.0 | 4.0 |
|  |  |  | RS-75 | 3.0 | — | — | — | — |
|  |  | Fluorine-containing urethane acrylate other than (S) | 602A | — | — | — | — | — |
|  |  | Perfluoroalkyl-based monomer (T) | FAAC-6 | 4.0 | 10.0 | 3.0 | 4.0 | 4.0 |
|  |  |  | FAAC-4 | — | — | — | — | — |
|  |  |  | V8FM | — | — | — | — | — |
|  |  | Perfluoroalkyl-based monomer other than (T) | V4F | — | — | — | — | — |
|  |  |  | C10A | — | — | — | — | — |
|  |  | Block copolymer | F606 | — | — | — | 1.0 | 4.0 |
|  |  | Perfluoropolyether-based oligomer | MT70 | — | — | — | — | — |
|  |  |  | 1203E | — | — | — | — | — |
|  | Polymerization initiator | Acylphosphine oxide-based photopolymerization initiator | 819 | 1.5 | 1.5 | 1.5 | 1.5 | 1.5 |
|  |  |  | TPO | — | — | — | — | — |
|  |  | Alkylphenone-based photopolymerization initiator | 184 | 1.5 | 1.5 | 1.5 | 1.5 | 1.5 |

TABLE 3

|  |  | Component | Abbreviation | Polymerizable composition | | | |
|---|---|---|---|---|---|---|---|
|  |  |  |  | A11 | A12 | A13 | A14 |
| Amount (parts by weight) | Polymerizable monomer (R) | Bifunctional acrylate (R1) | M282 | 75.0 | 75.0 | 5.0 | 43.0 |
|  |  |  | M280 | — | — | 70.0 | — |
|  |  | Multifunctional acrylate (R2) | M300 | 15.0 | 15.0 | 15.0 | 47.0 |
|  |  |  | M600 | — | — | — | — |
|  |  |  | U-10 | — | — | — | — |
|  |  | Multifunctional acrylate other than (R1) and (R2) | 5027E | — | — | — | — |
|  |  | Monofunctional amide monomer | AC | 10.0 | 10.0 | 10.0 | 10.0 |
|  |  | Reactive diluent | E8110R | 4.0 | 4.0 | 4.0 | 4.0 |
|  | Fluorine-based compound | Urethane acrylate (S) | E8110 | 4.0 | 4.0 | 4.0 | 4.0 |
|  |  |  | RS-75 | — | — | — | — |

TABLE 3-continued

|  |  | Component | Abbreviation | Polymerizable composition | | | |
|---|---|---|---|---|---|---|---|
|  |  |  |  | A11 | A12 | A13 | A14 |
|  |  | Fluorine-containing urethane acrylate other than (S) | 602A | — | — | — | — |
|  |  | Perfluoroalkyl-based monomer (T) | FAAC-6 | 4.0 | 4.0 | 4.0 | 4.0 |
|  |  |  | FAAC-4 | — | — | — | — |
|  |  |  | V8FM | — | — | — | — |
|  |  | Perfluoroalkyl-based monomer other than (T) | V4F | — | — | — | — |
|  |  |  | C10A | — | — | — | — |
|  |  | Block copolymer | F606 | — | — | — | — |
|  |  | Perfluoropolyether based oligomer | MT70 | — | — | — | — |
|  |  |  | 1203E | — | — | — | — |
|  | Polymerization initiator | Acylphosphine oxide-based photopolymerization initiator | 819 | — | 3.0 | 1.5 | 1.5 |
|  |  |  | TPO | 1.5 | — | — | — |
|  |  | Alkylphenone-based photopolymerization initiator | 184 | 1.5 | — | 1.5 | 1.5 |

TABLE 4

|  |  | Component | Abbreviation | Polymerizable composition | | | |
|---|---|---|---|---|---|---|---|
|  |  |  |  | A15 | A16 | A17 | A18 |
| Amount (parts by weight) | Polymerizable monomer (R) | Bifunctional acrylate (R1) | M282 | 75.0 | 75.0 | 80.0 | 75.0 |
|  |  |  | M280 | — | — | — | 60.0 |
|  |  | Multifunctional acrylate (R2) | M300 | — | — | 15.0 | 15.0 |
|  |  |  | M600 | 15.0 | — | — | — |
|  |  |  | U-10 | — | 15.0 | — | — |
|  |  | Multifunctional acrylate other than (R1) and (R2) | 5027E | — | — | — | — |
|  |  | Monofunctional amide monomer | AC | 10.0 | 10.0 | 18.2 | 23.0 |
|  |  | Reactive diluent | E8110R | 4.0 | 4.0 | — | — |
|  | Fluorine-based compound | Urethane acrylate (S) | E8110 | 4.0 | 4.0 | — | — |
|  |  |  | RS-75 | — | — | 18.2 | 4.9 |
|  |  | Fluorine-containing urethane acrylate other than (S) | 602A | — | — | — | — |
|  |  | Perfluoroalkyl-based monomer (T) | FAAC-6 | 4.0 | 4.0 | 12.2 | 4.8 |
|  |  |  | FAAC-4 | — | — | — | — |
|  |  |  | V8FM | — | — | — | — |
|  |  | Perfluoroalkyl-based monomer other than (T) | V4F | — | — | — | — |
|  |  |  | C10A | — | — | — | — |
|  |  | Block copolymer | F606 | — | — | — | — |
|  |  | Perfluoropolyether based oligomer | MT70 | — | — | — | — |
|  |  |  | 1203E | — | — | — | — |
|  | Polymerization initiator | Acylphosphine oxide-based photopolymerization initiator | 819 | 1.5 | 1.5 | 2.0 | 1.0 |
|  |  |  | TPO | — | — | — | — |
|  |  | Alkylphenone-based photopolymerization initiator | 184 | 1.5 | 1.5 | 2.0 | 1.0 |

TABLE 5

|  |  | Component | Abbreviation | Polymerizable composition | | | |
|---|---|---|---|---|---|---|---|
|  |  |  |  | B1 | B2 | B3 | B4 |
| Amount (parts by weight) | Polymerizable monomer (R) | Bifunctional acrylate (R1) | M282 | 75.0 | 75.0 | 75.0 | 75.0 |
|  |  |  | M280 | — | — | — | — |
|  |  | Multifunctional acrylate (R2) | M300 | 15.0 | 15.0 | 15.0 | 15.0 |
|  |  |  | M600 | — | — | — | — |
|  |  |  | U-10 | — | — | — | — |
|  |  | Multifunctional acrylate other than (R1) and (R2) | 5027E | — | — | — | — |
|  |  | Monofunctional amide monomer | AC | 10.0 | 10.0 | 10.0 | 10.0 |
|  |  | Reactive diluent | E8110R | — | — | — | — |
|  | Fluorine-based compound | Urethane acrylate (S) | E8110 | — | — | — | — |
|  |  |  | RS-75 | — | — | 4.0 | — |
|  |  | Fluorine-containing urethane acrylate other than (S) | 602A | — | — | — | — |
|  |  | Perfluoroalkyl-based monomer (T) | FAAC-6 | — | 4.0 | — | 4.0 |
|  |  |  | FAAC-4 | — | — | — | — |
|  |  |  | V8FM | — | — | — | — |

TABLE 5-continued

|  | Component | Abbreviation | Polymerizable composition | | | |
|---|---|---|---|---|---|---|
|  |  |  | B1 | B2 | B3 | B4 |
|  | Perfluoroalkyl-based monomer other than (T) | V4F | — | — | — | — |
|  |  | C10A | — | — | — | — |
|  | Block copolymer | F606 | — | — | — | — |
|  | Perfluoropolyether based oligomer | MT70 | — | — | — | 4.0 |
|  |  | 1203E | — | — | — | — |
| Polymerization initiator | Acylphosphine oxide-based photopolymerization initiator | 819 | 1.5 | 1.5 | 1.5 | 1.5 |
|  |  | TPO | — | — | — | — |
|  | Alkylphenone-based photopolymerization initiator | 184 | 1.5 | 1.5 | 1.5 | 1.5 |

TABLE 6

|  |  | Component | Abbreviation | Polymerizable composition | | | |
|---|---|---|---|---|---|---|---|
|  |  |  |  | B5 | B6 | B7 | B8 |
| Amount (parts by weight) | Polymerizable monomer (R) | Bifunctional acrylate (R1) | M282 | 75.0 | 75.0 | 75.0 | 75.0 |
|  |  |  | M280 | — | — | — | — |
|  |  | Multifunctional acrylate (R2) | M300 | 15.0 | 15.0 | 15.0 | 15.0 |
|  |  |  | M600 | — | — | — | — |
|  |  |  | U-10 | — | — | — | — |
|  |  | Multifunctional acrylate other than (R1) and (R2) | 5027E | — | — | — | — |
|  |  | Monofunctional amide monomer | AC | 10.0 | 10.0 | 10.0 | 10.0 |
|  |  | Reactive diluent | E8110R | — | — | — | 4.0 |
|  | Fluorine-based compound | Urethane acrylate (S) | E8110 | — | — | — | 4.0 |
|  |  |  | RS-75 | — | 17.0 | 2.5 | — |
|  |  | Fluorine-containing urethane acrylate other than (S) | 602A | — | — | — | — |
|  |  | Perfluoroalkyl-based monomer (T) | FAAC-6 | 4.0 | 4.0 | 4.0 | — |
|  |  |  | FAAC-4 | — | — | — | — |
|  |  |  | V8FM | — | — | — | — |
|  |  | Perfluoroalkyl-based monomer other than (T) | V4F | — | — | — | — |
|  |  |  | C10A | — | — | — | 4.0 |
|  |  | Block copolymer | F606 | — | — | — | — |
|  |  | Perfluoropolyether based oligomer | MT70 | — | — | — | — |
|  |  |  | 1203E | 4.0 | — | — | — |
|  | Polymerization initiator | Acylphosphine oxide-based photopolymerization initiator | 819 | 1.5 | 1.5 | 1.5 | 1.5 |
|  |  |  | TPO | — | — | — | — |
|  |  | Alkylphenone-based photopolymerization initiator | 184 | 1.5 | 1.5 | 1.5 | 1.5 |

TABLE 7

|  |  | Component | Abbreviation | Polymerizable composition | | | |
|---|---|---|---|---|---|---|---|
|  |  |  |  | B9 | B10 | B11 | B12 |
| Amount (parts by weight) | Polymerizable monomer (R) | Bifunctional acrylate (R1) | M282 | 75.0 | — | 63.0 | 38.0 |
|  |  |  | M280 | — | — | 30.0 | — |
|  |  | Multifunctional acrylate (R2) | M300 | 15.0 | 15.0 | — | 55.0 |
|  |  |  | M600 | — | — | — | — |
|  |  |  | U-10 | — | — | — | — |
|  |  | Multifunctional acrylate other than (R1) and (R2) | 5027E | — | 75.0 | — | — |
|  |  | Monofunctional amide monomer | AC | 10.0 | 10.0 | 7.0 | 7.0 |
|  |  | Reactive diluent | E8110R | 4.0 | 4.0 | 4.0 | 4.0 |
|  | Fluorine-based compound | Urethane acrylate (S) | E8110 | 4.0 | 4.0 | 4.0 | 4.0 |
|  |  |  | RS-75 | — | — | — | — |
|  |  | Fluorine-containing urethane acrylate other than (S) | 602A | — | — | — | — |
|  |  | Perfluoroalkyl-based monomer (T) | FAAC-6 | — | 4.0 | 4.0 | 4.0 |
|  |  |  | FAAC-4 | — | — | — | — |
|  |  |  | V8FM | — | — | — | — |
|  |  | Perfluoroalkyl-based monomer other than (T) | V4F | — | — | — | — |
|  |  |  | C10A | 4.0 | — | — | — |
|  |  | Block copolymer | F606 | — | — | — | — |
|  |  | Perfluoropolyether based oligomer | MT70 | — | — | — | — |
|  |  |  | 1203E | — | — | — | — |

TABLE 7-continued

|  | Component | Abbreviation | Polymerizable composition | | | |
|---|---|---|---|---|---|---|
|  |  |  | B9 | B10 | B11 | B12 |
| Polymerization initiator | Acylphosphine oxide-based photopolymerization initiator | 819 | 1.5 | 1.5 | 1.5 | 1.5 |
|  |  | TPO | — | — | — | — |
|  | Alkylphenone-based photopolymerization initiator | 184 | 1.5 | 1.5 | 1.5 | 1.5 |

TABLE 8

|  |  | Component | Abbreviation | Polymerizable composition | | | |
|---|---|---|---|---|---|---|---|
|  |  |  |  | B13 | B14 | B15 | B16 |
| Amount (parts by weight) | Polymerizable monomer (R) | Bifunctional acrylate (R1) | M282 | 75.0 | 75.0 | 75.0 | 80.0 |
|  |  |  | M280 | — | — | — | — |
|  |  | Multifunctional acrylate (R2) | M300 | 15.0 | 15.0 | 15.0 | 15.0 |
|  |  |  | M600 | — | — | — | — |
|  |  |  | U-10 | — | — | — | — |
|  |  | Multifunctional acrylate other than (R1) and (R2) | 5027E | — | — | — | — |
|  |  | Monofunctional amide monomer | AC | 10.0 | 10.0 | 10.0 | 19.2 |
|  |  | Reactive diluent | E8110R | — | — | — | — |
|  | Fluorine-based compound | Urethane acrylate (S) | E8110 | — | — | — | — |
|  |  |  | RS-75 | — | 2.3 | 4.0 | 19.2 |
|  |  | Fluorine-containing urethane acrylate other than (S) | 602A | 4.0 | — | — | — |
|  |  | Perfluoroalkyl-based monomer (T) | FAAC-6 | 4.0 | 2.5 | 11.0 | 13.0 |
|  |  |  | FAAC-4 | — | — | — | — |
|  |  |  | V8FM | — | — | — | — |
|  |  | Perfluoroalkyl-based monomer other than (T) | V4F | — | — | — | — |
|  |  |  | C10A | — | — | — | — |
|  |  | Block copolymer | F606 | — | — | — | — |
|  |  | Perfluoropolyether based oligomer | MT70 | — | — | — | — |
|  |  |  | 1203E | — | — | — | — |
| Polymerization initiator | | Acylphosphine oxide-based photopolymerization initiator | 819 | 1.5 | 1.5 | 1.5 | 5.0 |
|  |  |  | TPO | — | — | — | — |
|  |  | Alkylphenone-based photopolymerization initiator | 184 | 1.5 | 1.5 | 1.5 | 5.0 |

Tables 9 to 16 show the percentages of the components (in terms of active components) and the ethylene oxide group concentrations in the polymerizable compositions A1 to A18 and B1 to B16.

TABLE 9

|  |  | Component | Polymerizable composition | | | | |
|---|---|---|---|---|---|---|---|
|  |  |  | A1 | A2 | A3 | A4 | A5 |
| Percentage (wt %) | Polymerizable monomer (R) | Bifunctional acrylate (R1) | 65.22 | 67.58 | 64.10 | 64.10 | 57.36 |
|  |  | Multifunctional acrylate (R2) | 13.04 | 13.51 | 12.82 | 12.82 | 12.30 |
|  |  | Multifunctional acrylate other than (R1) and (R2) | — | — | — | — | — |
|  |  | Monofunctional amide monomer | 8.70 | 9.01 | 8.55 | 8.55 | 12.30 |
|  |  | Reactive diluent | 3.48 | — | 3.42 | 3.42 | — |
|  |  | Total | 90.44 | 90.10 | 88.89 | 88.89 | 81.96 |
|  | Fluorine-based compound | Urethane acrylate (S) | 3.48 | 3.60 | 3.42 | 3.42 | 12.30 |
|  |  | Fluorine-containing urethane acrylate other than (S) | — | — | — | — | — |
|  |  | Perfluoroalkyl-based monomer (T) | 3.48 | 3.60 | 5.13 | 5.13 | 3.28 |
|  |  | Perfluoroalkyl-based monomer other than (T) | — | — | — | — | — |
|  |  | Block copolymer | — | — | — | — | — |
|  |  | Perfluoropolyether-based oligomer | — | — | — | — | — |
|  |  | Total | 6.96 | 7.20 | 8.55 | 8.55 | 15.58 |

TABLE 9-continued

|  | Component | Polymerizable composition | | | | |
|---|---|---|---|---|---|---|
|  |  | A1 | A2 | A3 | A4 | A5 |
| Polymerization initiator | Acylphosphine oxide-based photopolymerization initiator | 1.30 | 1.35 | 1.28 | 1.28 | 1.23 |
|  | Alkylphenone-based photopolymerization initiator | 1.30 | 1.35 | 1.28 | 1.28 | 1.23 |
|  | Total | 2.60 | 2.70 | 2.56 | 2.56 | 2.46 |
| Ethylene oxide group concentration (wt %) |  | 37.27 | 38.62 | 36.63 | 36.63 | 32.78 |

TABLE 10

|  |  | Component | Polymerizable composition | | | | |
|---|---|---|---|---|---|---|---|
|  |  |  | A6 | A7 | A8 | A9 | A10 |
| Percentage (wt %) | Polymerizable monomer (R) | Bifunctional acrylate (R1) | 68.18 | 61.98 | 65.78 | 64.66 | 63.03 |
|  |  | Multifunctional acrylate (R2) | 13.64 | 12.40 | 13.16 | 12.93 | 12.61 |
|  |  | Multifunctional acrylate other than (R1) and (R2) | — | — | — | — | — |
|  |  | Monofunctional amide monomer | 9.09 | 8.26 | 8.77 | 8.62 | 8.40 |
|  |  | Reactive diluent | — | 3.31 | 3.51 | 3.45 | 3.36 |
|  |  | Total | 90.91 | 85.95 | 91.22 | 89.66 | 87.40 |
|  | Fluorine-based compound | Urethane acrylate (S) | 2.73 | 3.31 | 3.51 | 3.45 | 3.36 |
|  |  | Fluorine-containing urethane acrylate other than (S) | — | — | — | — | — |
|  |  | Perfluoroalkyl-based monomer (T) | 3.64 | 8.26 | 2.63 | 3.45 | 3.36 |
|  |  | Perfluoroalkyl-based monomer other than (T) | — | — | — | — | — |
|  |  | Block copolymer | — | — | — | 0.86 | 3.36 |
|  |  | Perfluoropolyether-based oligomer | — | — | — | — | — |
|  |  | Total | 6.37 | 11.57 | 6.14 | 7.76 | 10.08 |
|  | Polymerization initiator | Acylphosphine oxide-based photopolymerization initiator | 1.36 | 1.24 | 1.32 | 1.29 | 1.26 |
|  |  | Alkylphenone-based photopolymerization initiator | 1.36 | 1.24 | 1.32 | 1.29 | 1.26 |
|  |  | Total | 2.72 | 2.48 | 2.64 | 2.58 | 2.52 |
| Ethylene oxide group concentration (wt %) |  |  | 38.96 | 35.42 | 37.59 | 36.95 | 36.02 |

TABLE 11

|  |  | Component | Polymerizable composition | | | |
|---|---|---|---|---|---|---|
|  |  |  | A11 | A12 | A13 | A14 |
| Percentage (wt %) | Polymerizable monomer (R) | Bifunctional acrylate (R1) | 65.22 | 65.22 | 65.22 | 37.39 |
|  |  | Multifunctional acrylate (R2) | 13.04 | 13.04 | 13.04 | 40.87 |
|  |  | Multifunctional acrylate other than (R1) and (R2) | — | — | — | — |
|  |  | Monofunctional amide monomer | 8.70 | 8.70 | 8.70 | 8.70 |
|  |  | Reactive diluent | 3.48 | 3.48 | 3.48 | 3.48 |
|  |  | Total | 90.44 | 90.44 | 90.44 | 90.44 |
|  | Fluorine-based compound | Urethane acrylate (S) | 3.48 | 3.48 | 3.48 | 3.48 |
|  |  | Fluorine-containing urethane acrylate other than (S) | — | — | — | — |
|  |  | Perfluoroalkyl-based monomer (T) | 3.48 | 3.48 | 3.48 | 3.48 |
|  |  | Perfluoroalkyl-based monomer other than (T) | — | — | — | — |
|  |  | Block copolymer | — | — | — | — |
|  |  | Perfluoropolyether-based oligomer | — | — | — | — |
|  |  | Total | 6.96 | 6.96 | 6.96 | 6.96 |

TABLE 11-continued

|  |  | Polymerizable composition | | | |
|---|---|---|---|---|---|
|  | Component | A11 | A12 | A13 | A14 |
| Polymerization initiator | Acylphosphine oxide-based photopolymerization initiator | 1.30 | 2.60 | 1.30 | 1.30 |
|  | Alkylphenone-based photopolymerization initiator | 1.30 | — | 1.30 | 1.30 |
|  | Total | 2.60 | 2.60 | 2.60 | 2.60 |
| Ethylene oxide group concentration (wt %) |  | 37.27 | 37.27 | 48.57 | 21.37 |

TABLE 12

|  |  |  | Polymerizable composition | | | |
|---|---|---|---|---|---|---|
|  |  | Component | A15 | A16 | A17 | A18 |
| Percentage (wt %) | Polymerizable monomer (R) | Bifunctional acrylate (R1) | 65.22 | 65.22 | 54.19 | 73.10 |
|  |  | Multifunctional acrylate (R2) | 13.04 | 13.04 | 10.16 | 8.12 |
|  |  | Multifunctional acrylate other than (R1) and (R2) | — | — | — | — |
|  |  | Monofunctional amide monomer | 8.70 | 8.70 | 12.33 | 12.45 |
|  |  | Reactive diluent | 3.48 | 3.48 | — | — |
|  |  | Total | 90.44 | 90.44 | 76.68 | 93.67 |
|  | Fluorine-based compound | Urethane acrylate (S) | 3.48 | 3.48 | 12.33 | 2.65 |
|  |  | Fluorine-containing urethane acrylate other than (S) | — | — | — | — |
|  |  | Perfluoroalkyl-based monomer (T) | 3.48 | 3.48 | 8.27 | 2.60 |
|  |  | Perfluoroalkyl-based monomer other than (T) | — | — | — | — |
|  |  | Block copolymer | — | — | — | — |
|  |  | Perfluoropolyether-based oligomer | — | — | — | — |
|  |  | Total | 6.96 | 6.96 | 20.60 | 5.25 |
|  | Polymerization initiator | Acylphosphine oxide-based photopolymerization initiator | 1.30 | 1.30 | 1.36 | 0.54 |
|  |  | Alkylphenone-based photopolymerization initiator | 1.30 | 1.30 | 1.36 | 0.54 |
|  |  | Total | 2.60 | 2.60 | 2.72 | 1.08 |
| Ethylene oxide group concentration (wt %) |  |  | 37.27 | 37.27 | 30.97 | 47.81 |

TABLE 13

|  |  |  | Polymerizable composition | | | |
|---|---|---|---|---|---|---|
|  |  | Component | B1 | B2 | B3 | B4 |
| Percentage (wt %) | Polymerizable monomer (R) | Bifunctional acrylate (R1) | 72.81 | 70.09 | 70.09 | 67.58 |
|  |  | Multifunctional acrylate (R2) | 14.56 | 14.02 | 14.02 | 13.51 |
|  |  | Multifunctional acrylate other than (R1) and (R2) | — | — | — | — |
|  |  | Monofunctional amide monomer | 9.71 | 9.35 | 9.35 | 9.01 |
|  |  | Reactive diluent | — | — | — | — |
|  |  | Total | 97.08 | 93.46 | 93.46 | 90.10 |
|  | Fluorine-based compound | Urethane acrylate (S) | — | — | 3.74 | — |
|  |  | Fluorine-containing urethane acrylate other than (S) | — | — | — | — |
|  |  | Perfluoroalkyl-based monomer (T) | — | 3.74 | — | 3.60 |
|  |  | Perfluoroalkyl-based monomer other than (T) | — | — | — | — |
|  |  | Block copolymer | — | — | — | — |
|  |  | Perfluoropolyether-based oligomer | — | — | — | 3.60 |
|  |  | Total | — | 3.74 | 3.74 | 7.20 |

TABLE 13-continued

|  | Component | Polymerizable composition | | | |
|---|---|---|---|---|---|
|  |  | B1 | B2 | B3 | B4 |
| Polymerization initiator | Acylphosphine oxide-based photopolymerization initiator | 1.46 | 1.40 | 1.40 | 1.35 |
|  | Alkylphenone-based photopolymerization initiator | 1.46 | 1.40 | 1.40 | 1.35 |
|  | Total | 2.92 | 2.80 | 2.80 | 2.70 |
| Ethylene oxide group concentration (wt %) | | 41.61 | 40.05 | 40.05 | 38.62 |

TABLE 14

|  |  | Component | Polymerizable composition | | | |
|---|---|---|---|---|---|---|
|  |  |  | B5 | B6 | B7 | B8 |
| Percentage (wt %) | Polymerizable monomer (R) | Bifunctional acrylate (R1) | 67.58 | 60.48 | 68.50 | 65.22 |
|  |  | Multifunctional acrylate (R2) | 13.51 | 12.10 | 13.70 | 13.04 |
|  |  | Multifunctional acrylate other than (R1) and (R2) | — | — | — | — |
|  |  | Monofunctional amide monomer | 9.01 | 8.06 | 9.13 | 8.70 |
|  |  | Reactive diluent | — | — | — | 3.48 |
|  |  | Total | 90.10 | 80.64 | 91.33 | 90.44 |
|  | Fluorine-based compound | Urethane acrylate (S) | — | 13.71 | 2.28 | 3.48 |
|  |  | Fluorine-containing urethane acrylate other than (S) | — | — | — | — |
|  |  | Perfluoroalkyl-based monomer (T) | 3.60 | 3.23 | 3.65 | — |
|  |  | Perfluoroalkyl-based monomer other than (T) | — | — | — | 3.48 |
|  |  | Block copolymer | — | — | — | — |
|  |  | Perfluoropolyether-based oligomer | 3.60 | — | — | — |
|  |  | Total | 7.20 | 16.94 | 5.93 | 6.96 |
|  | Polymerization initiator | Acylphosphine oxide-based photopolymerization initiator | 1.35 | 1.21 | 1.37 | 1.30 |
|  |  | Alkylphenone-based photopolymerization initiator | 1.35 | 1.21 | 1.37 | 1.30 |
|  |  | Total | 2.70 | 2.42 | 2.74 | 2.60 |
| Ethylene oxide group concentration (wt %) | | | 38.62 | 34.56 | 39.14 | 37.27 |

TABLE 15

|  |  | Component | Polymerizable composition | | | |
|---|---|---|---|---|---|---|
|  |  |  | B9 | B10 | B11 | B12 |
| Percentage (wt %) | Polymerizable monomer (R) | Bifunctional acrylate (R1) | 65.22 | — | 80.87 | 33.04 |
|  |  | Multifunctional acrylate (R2) | 13.04 | 13.04 | — | 47.83 |
|  |  | Multifunctional acrylate other than (R1) and (R2) | — | 65.22 | — | — |
|  |  | Monofunctional amide monomer | 8.70 | 8.70 | 6.09 | 6.09 |
|  |  | Reactive diluent | 3.48 | 3.48 | 3.48 | 3.48 |
|  |  | Total | 90.44 | 90.44 | 90.44 | 90.44 |
|  | Fluorine-based compound | Urethane acrylate (S) | 3.48 | 3.48 | 3.48 | 3.48 |
|  |  | Fluorine-containing urethane acrylate other than (S) | — | — | — | — |
|  |  | Perfluoroalkyl-based monomer (T) | — | 3.48 | 3.48 | 3.48 |
|  |  | Perfluoroalkyl-based monomer other than (T) | 3.48 | — | — | — |
|  |  | Block copolymer | — | — | — | — |
|  |  | Perfluoropolyether-based oligomer | — | — | — | — |
|  |  | Total | 6.96 | 6.96 | 6.96 | 6.96 |

TABLE 15-continued

| | | Polymerizable composition | | | |
|---|---|---|---|---|---|
| | Component | B9 | B10 | B11 | B12 |
| Polymerization initiator | Acylphosphine oxide-based photopolymerization initiator | 1.30 | 1.30 | 1.30 | 1.30 |
| | Alkylphenone-based photopolymerization initiator | 1.30 | 1.30 | 1.30 | 1.30 |
| | Total | 2.60 | 2.60 | 2.60 | 2.60 |
| Ethylene oxide group concentration (wt %) | | 37.27 | 35.03 | 51.06 | 18.88 |

TABLE 16

| | | | Polymerizable composition | | | |
|---|---|---|---|---|---|---|
| | | Component | B13 | B14 | B15 | B16 |
| Percentage (wt %) | Polymerizable monomer (R) | Bifunctional acrylate (R1) | 67.58 | 69.58 | 63.57 | 51.14 |
| | | Multifunctional acrylate (R2) | 13.51 | 13.91 | 12.71 | 9.59 |
| | | Multifunctional acrylate other than (R1) and (R2) | — | — | — | — |
| | | Monofunctional amide monomer | 9.01 | 9.28 | 8.47 | 12.28 |
| | | Reactive diluent | — | — | — | — |
| | | Total | 90.10 | 92.77 | 84.75 | 73.01 |
| | Fluorine-based compound | Urethane acrylate (S) | — | 2.13 | 3.39 | 12.28 |
| | | Fluorine-containing urethane acrylate other than (S) | 3.60 | — | — | — |
| | | Perfluoroalkyl-based monomer (T) | 3.60 | 2.32 | 9.32 | 8.31 |
| | | Perfluoroalkyl-based monomer other than (T) | — | — | — | — |
| | | Block copolymer | — | — | — | — |
| | | Perfluoropolyether-based oligomer | — | — | — | — |
| | | Total | 7.20 | 4.45 | 12.71 | 20.59 |
| | Polymerization initiator | Acylphosphine oxide-based photopolymerization initiator | 1.35 | 1.39 | 1.27 | 3.20 |
| | | Alkylphenone-based photopolymerization initiator | 1.35 | 1.39 | 1.27 | 3.20 |
| | | Total | 2.70 | 2.78 | 2.54 | 6.40 |
| Ethylene oxide group concentration (wt %) | | | 38.62 | 39.76 | 36.33 | 29.22 |

Example 1

An antifouling film of Example 1 was produced by the following method.

(A) Release Treatment of Die

A release agent was applied to a surface of a die. The thickness of the release agent was 5 nm. The surface coated with the release agent of a die had a contact angle (static contact angle) with water of about 130°.

(B) Application of Polymerizable Composition

The polymerizable composition A1 was applied to a surface of the substrate. The thickness of the polymerizable composition A1 was 35 μm.

(C) Formation of Uneven Structure

The substrate was pushed to the surface coated with the release agent of the die with the polymerizable composition A1 in between. As a result, an uneven structure was formed on the surface (the surface remote from the substrate) of the polymerizable composition A1.

(D) Formation of Polymer Layer

The polymerizable composition A1 was irradiated with ultraviolet rays (dose: 1 $J/cm^2$) from the substrate side, so that the polymerizable composition A1 was cured. As a result, a polymer layer was formed.

(E) Die Removal

The die was removed from the polymer layer. The polymer layer was then irradiated with ultraviolet rays (dose: 1 $J/cm^2$) from the side remote from the substrate, so that the polymer layer was further cured. As a result, an antifouling film was completed.

Then, die transferring (a series of the processes (B) to (E)) was repeated 100 times, whereby antifouling films were continuously produced. The antifouling film (100th antifouling film) produced in the 100th die transferring was obtained as the antifouling film of Example 1.

The polymer layer in the antifouling film of Example 1 had a thickness of 12 μm.

The surface specifications of the antifouling film of Example 1 were as follows.

Shape of projections: temple-bell-like shape

Average pitch of projections: 200 nm

Average height of projections: 200 nm

Average aspect ratio of projections: 1.0

The surface specifications of the antifouling film were evaluated using a scanning electron microscope "S-4700" from Hitachi High-Technologies Corp. For the evaluation, osmium(VIII) oxide from Fujifilm Wako Pure Chemical Corporation was applied (thickness: 5 nm) to the surface (the surface remote from the substrate) of the polymer layer using an osmium coater "Neoc-ST" from Meiwafosis Co., Ltd.

Examples 2 to 19 and Comparative Examples 1 to 16

An antifouling film (100th antifouling film) of each example was produced in the same manner as in Example 1, except that production conditions were changed according to Tables 17 to 24.

[Evaluations]

The antifouling films of the examples were subjected to the following evaluations. Tables 17 to 24 show the results.

<Transparency>

For the transparency, the transparency of the polymerizable composition was evaluated. Specifically, the polymerizable composition was placed in a clear test tube and left to stand in an environment with a temperature of 30° C. and a humidity of 85% for one week. Then, the condition of the polymerizable composition was visually observed in an environment with an illuminance of 100 lx (fluorescent lamp). The evaluation criteria were as follows.

Good: The composition was transparent or slightly cloudy.

Fair: The composition was slightly cloudy, but no precipitate was observed even after it was further left to stand for one day.

Poor: The composition was cloudy, and precipitates were observed after it was further left to stand for one day.

A higher transparency of the polymerizable composition was determined to show a higher compatibility of the components with each other in the polymerizable composition.

<Antifouling Properties>

For the antifouling properties, the oil repellency and the ease of wiping off fingerprints of the antifouling film were evaluated.

(Oil Repellency)

Hexadecane (about 10 μl of liquid droplets) was dropped on the surface (the surface remote from the substrate) of the polymer layer of the antifouling film, and the contact angle (static contact angle) was determined after 1 second, 10 minutes, and 60 minutes from the dropping. The cases with a contact angle with hexadecane of 30° or greater were evaluated as having excellent oil repellency.

The contact angles were each the average value of contact angles determined at the following three points by the θ/2 method (θ/2=arctan (h/r), wherein θ: contact angle, r: radius of droplet, h: height of droplet) using a portable contact angle meter "PCA-1" from Kyowa Interface Science Co., Ltd. The first measurement point selected was the central portion of the antifouling film. The second and third measurement points were two points that were 20 mm or more apart from the first measurement point and were point-symmetrical to each other about the first measurement point.

(Ease of Wiping Off Fingerprints)

First, a black acrylic plate "Acrylite EX-502" available from Mitsubishi Rayon Co., Ltd. was attached to the surface remote from the polymer layer of the substrate of the antifouling film with an optical adhesive layer in between. Next, "Bemcot® S-2", available from Asahi Kasei Fibers Corp. was impregnated with 0.1 ml of an artificial contamination liquid available from Isekyu Co., Ltd. as an assumed fingerprint. The artificial contamination liquid was then applied to a finger in a rubber glove. Then, the artificial contamination liquid was applied to the surface (the surface remote from the substrate) of the polymer layer of the antifouling film with the finger. After 10 minutes and 60 minutes from the application of the artificial contamination liquid, the surface was rubbed 10 times in a reciprocating motion using "Bemcot S-2" from Asahi Kasei Fibers Corp. Whether the artificial contamination liquid was wiped off or not was visually observed in an environment with an illuminance of 100 lx (fluorescent lamp). The evaluation criteria were as follows.

Good: The artificial contamination liquid was completely wiped off and no wiping residue was observed.

Fair: The artificial contamination liquid was not obvious, but slight wiping residue was observed when the light from the fluorescent lamp was reflected on the surface.

Poor: Slight wiping residue was observed without reflecting the light from the fluorescent lamp on the surface.

Bad: The artificial contamination liquid was not wiped off at all: wiping residue was obviously observed without reflecting the light from the fluorescent lamp on the surface.

The cases evaluated as good or fair were considered as having excellent ease of wiping off fingerprints.

<Rubbing Resistance>

A black acrylic plate "Acrylite EX-502" available from Mitsubishi Rayon Co., Ltd. was attached to the surface remote from the polymer layer of the substrate of the antifouling film with an optical adhesive layer in between. The surface (the surface remote from the substrate) of the polymer layer of the antifouling film was irradiated with light from a light source from a polar angle of 5° and the specular spectral reflectance at an incident angle of 5° was measured. The reflectance was measured with a spectrophotometer "UV-3100PC" from Shimadzu Corporation within the wavelength range of 380 to 780 nm. The average reflectance within the wavelength range of 450 to 650 nm was calculated based on the measurement results. The average reflectance is referred to as Reflectance F1 (unit: %).

The surface (the surface remote from the substrate) of the polymer layer was rubbed 10 times in a reciprocating motion with "Bemcot Labo®" from Asahi Kasei Fibers Corp. The specular spectral reflectance at an incident angle of 5° of the antifouling film was measured by the same procedure as described above. The average reflectance within the wavelength range of 450 to 650 nm was calculated based on the measurement results. The average reflectance is referred to as Reflectance F2 (unit: %).

Based on Reflectance F1 and Reflectance F2 determined as described above, the change rate "ΔF" (unit: %) of the reflectance was calculated according to the following formula (Y).

$$\Delta F = |100 \times (\text{Reflectance } F2 - \text{Reflectance } F1)/\text{Reflectance } F1| \qquad (Y)$$

The evaluation criteria were as follows.

Good: ΔF≤15

Fair: 15<ΔF<30

Poor: ΔF≥30 The cases evaluated as good or fair were considered as having excellent rubbing resistance at which the antifouling film (polymer layer) did not appear white.

TABLE 17

|  |  |  |  |  | Example 1 | Example 2 | Example 3 | Example 4 | Example 5 |
|---|---|---|---|---|---|---|---|---|---|
| Production conditions | Polymerizable composition |  |  |  | A1 | A2 | A3 | A4 | A5 |
|  | UV irradiation after die removal |  |  |  | Present | Present | Present | Present | Present |
| Evaluation | Polymerizable composition Antifouling film | Transparency |  |  | Good | Good | Good | Good | Fair |
|  |  | Antifouling properties | Oil repellency | Contact angle with hexadecane (°) 1 sec. | 93.2 | 92.8 | 91.4 | 89.3 | 93.1 |
|  |  |  |  | 10 min. | 91.5 | 90.9 | 84.3 | 80.7 | 91.4 |
|  |  |  |  | 60 min. | 88.6 | 87.7 | 67.2 | 48.2 | 90.1 |
|  |  |  | Ease of wiping off fingerprints | 10 min. | Good | Good | Good | Good | Good |
|  |  |  |  | 60 min. | Good | Good | Fair | Fair | Good |
|  |  | Rubbing resistance |  |  | Good | Good | Good | Good | Fair |

TABLE 18

|  |  |  |  |  | Example 6 | Example 7 | Example 8 | Example 9 | Example 10 |
|---|---|---|---|---|---|---|---|---|---|
| Production conditions | Polymerizable composition |  |  |  | A6 | A7 | A8 | A9 | A10 |
|  | UV irradiation after die removal |  |  |  | Present | Present | Present | Present | Present |
| Evaluation | Polymerizable composition Antifouling film | Transparency |  |  | Good | Fair | Good | Fair | Fair |
|  |  | Antifouling properties | Oil repellency | Contact angle with hexadecane (°) 1 sec. | 83.3 | 95.7 | 83.3 | 95.2 | 95.4 |
|  |  |  |  | 10 min. | 79.6 | 93.3 | 75.2 | 93.3 | 93.0 |
|  |  |  |  | 60 min. | 61.2 | 92.5 | 59.8 | 92.1 | 92.2 |
|  |  |  | Ease of wiping off fingerprints | 10 min. | Good | Good | Good | Good | Good |
|  |  |  |  | 60 min. | Fair | Good | Fair | Good | Good |
|  |  | Rubbing resistance |  |  | Good | Good | Fair | Good | Good |

TABLE 19

|  |  |  |  |  | Example 11 | Example 12 | Example 13 | Example 14 | Example 15 |
|---|---|---|---|---|---|---|---|---|---|
| Production conditions | Polymerizable composition |  |  |  | A11 | A12 | A1 | A13 | A14 |
|  | UV irradiation after die removal |  |  |  | Present | Present | Absent | Present | Present |
| Evaluation | Polymerizable composition Antifouling film | Transparency |  |  | Good | Good | Good | Fair | Good |
|  |  | Antifouling properties | Oil repellency | Contact angle with hexadecane (°) 1 sec. | 92.4 | 90.1 | 90.4 | 94.1 | 84.5 |
|  |  |  |  | 10 min. | 90.8 | 82.3 | 85.3 | 92.3 | 80.2 |
|  |  |  |  | 60 min. | 87.3 | 65.2 | 68.2 | 90.5 | 64.8 |
|  |  |  | Ease of wiping off fingerprints | 10 min. | Good | Good | Good | Good | Good |
|  |  |  |  | 60 min. | Good | Fair | Fair | Good | Fair |
|  |  | Rubbing resistance |  |  | Good | Good | Good | Good | Good |

TABLE 20

|  |  |  |  |  | Example 16 | Example 17 | Example 18 | Example 19 |
|---|---|---|---|---|---|---|---|---|
| Production conditions | Polymerizable composition |  |  |  | A15 | A16 | A17 | A18 |
|  | UV irradiation after die removal |  |  |  | Present | Present | Present | Present |
| Evaluation | Polymerizable composition Antifouling film | Transparency |  |  | Good | Fair | Fair | Good |
|  |  | Antifouling properties | Oil repellency | Contact angle with hexadecane (°) 1 sec. | 91.3 | 82.1 | 94.8 | 80.4 |
|  |  |  |  | 10 min. | 90.1 | 78.2 | 92.3 | 75.6 |
|  |  |  |  | 60 min. | 85.2 | 62.3 | 91.8 | 57.8 |
|  |  |  | Ease of wiping off fingerprints | 10 min. | Good | Good | Good | Good |
|  |  |  |  | 60 min. | Good | Fair | Good | Fair |
|  |  | Rubbing resistance |  |  | Good | Good | Fair | Fair |

TABLE 21

|  |  |  |  |  | Comparative Example 1 | Comparative Example 2 | Comparative Example 3 | Comparative Example 4 |
|---|---|---|---|---|---|---|---|---|
| Production conditions | Polymerizable composition | | | | B1 | B2 | B3 | B4 |
| | UV irradiation after die removal | | | | Present | Present | Present | Present |
| Evaluation | Polymerizable composition | Transparency | | | Good | Good | Good | Good |
| | Antifouling film | Antifouling properties | Oil repellency | Contact angle with hexadecane (°) | 1 sec. | 15.3 | 30.6 | 45.3 | 90.2 |
| | | | | | 10 min. | 11.3 | 23.3 | 37.4 | 80.5 |
| | | | | | 60 min. | 10.8 | 22.3 | 28.1 | 26.3 |
| | | | Ease of wiping off fingerprints | | 10 min. | Bad | Poor | Fair | Good |
| | | | | | 60 min. | Bad | Poor | Poor | Poor |
| | | Rubbing resistance | | | Poor | Fair | Fair | Good |

TABLE 22

|  |  |  |  |  | Comparative Example 5 | Comparative Example 6 | Comparative Example 7 | Comparative Example 8 |
|---|---|---|---|---|---|---|---|---|
| Production conditions | Polymerizable composition | | | | B5 | B6 | B7 | B8 |
| | UV irradiation after die removal | | | | Present | Present | Present | Present |
| Evaluation | Polymerizable composition | Transparency | | | Good | Poor | Good | Good |
| | Antifouling film | Antifouling properties | Oil repellency | Contact angle with hexadecane (°) | 1 sec. | 88.8 | — | 52.8 | 49.2 |
| | | | | | 10 min. | 76.5 | — | 40.8 | 37.1 |
| | | | | | 60 min. | 24.8 | — | 22.4 | 22.1 |
| | | | Ease of wiping off fingerprints | | 10 min. | Good | — | Fair | Fair |
| | | | | | 60 min. | Poor | — | Poor | Poor |
| | | Rubbing resistance | | | Good | — | Fair | Good |

TABLE 23

|  |  |  |  |  | Comparative Example 9 | Comparative Example 10 | Comparative Example 11 | Comparative Example 12 |
|---|---|---|---|---|---|---|---|---|
| Production conditions | Polymerizable composition | | | | B9 | B10 | B11 | B12 |
| | UV irradiation after die removal | | | | Present | Present | Present | Present |
| Evaluation | Polymerizable composition | Transparency | | | Poor | Poor | Poor | Good |
| | Antifouling film | Antifouling properties | Oil repellency | Contact angle with hexadecane (°) | 1 sec. | — | — | — | 78.6 |
| | | | | | 10 min. | — | — | — | 67.3 |
| | | | | | 60 min. | — | — | — | 28.1 |
| | | | Ease of wiping off fingerprints | | 10 min. | — | — | — | Fair |
| | | | | | 60 min. | — | — | — | Poor |
| | | Rubbing resistance | | | — | — | — | Good |

TABLE 24

|  |  |  |  |  | Comparative Example 13 | Comparative Example 14 | Comparative Example 15 | Comparative Example 16 |
|---|---|---|---|---|---|---|---|---|
| Production conditions | Polymerizable composition | | | | B13 | B14 | B15 | B16 |
| | UV irradiation after die removal | | | | Present | Present | Present | Present |
| Evaluation | Polymerizable composition | Transparency | | | Good | Good | Poor | Fair |
| | Antifouling film | Antifouling properties | Oil repellency | Contact angle with hexadecane (°) | 1 sec. | 87.5 | 71.3 | — | 92.8 |
| | | | | | 10 min. | 72.1 | 39.2 | — | 91.8 |
| | | | | | 60 min. | 27.3 | 28.2 | — | 90.2 |

TABLE 24-continued

|  |  | Comparative Example 13 | Comparative Example 14 | Comparative Example 15 | Comparative Example 16 |
|---|---|---|---|---|---|
| Ease of wiping off fingerprints | 10 min. | Good | Fair | — | — |
|  | 60 min. | Poor | Poor | — | — |
| Rubbing resistance |  | Good | Fair | — | Poor |

Tables 17 to 20 show that, in Examples 1 to 19, the antifouling properties of the antifouling films were kept high even after 60 minutes and thus long-term high antifouling properties were achieved. Also, the antifouling films of Examples 1 to 19 had excellent rubbing resistance.

Tables 21 to 24 show that Comparative Examples 1 to 16 failed to provide an antifouling film having excellent rubbing resistance and long-term high antifouling properties.

In Comparative Example 1, the polymerizable composition contained no fluorine-based compound. Thus, the antifouling properties of the antifouling film were low from an initial stage, which prevented achievement of long-term high antifouling properties. Also, in Comparative Example 1, the polymerizable composition had a polymerizable monomer (R) content of higher than 95 wt % in terms of active components, which reduced the rubbing resistance of the antifouling film.

In Comparative Example 2, the polymerizable composition contained as a fluorine-based compound the perfluoroalkyl-based monomer (T) alone, which prevented the antifouling film from having long-term high antifouling properties.

In Comparative Example 3, the polymerizable composition contained as a fluorine-based compound the urethane acrylate (S) alone, which prevented the antifouling film from having long-term high antifouling properties.

In Comparative Examples 4 and 5, although the polymerizable composition contained as a fluorine-based compound the perfluoroalkyl-based monomer (T), the polymerizable composition further contained not the urethane acrylate (S) but a perfluoropolyether-based oligomer, which prevented the antifouling film from having long-term high antifouling properties.

In Comparative Example 6, the polymerizable composition, having a urethane acrylate (S) content of higher than 12.5 wt % in terms of active components, was cloudy, which resulted in reduced transparency (whitening) of the antifouling film (polymer layer). Accordingly, evaluations for the antifouling properties and the rubbing resistance were not performed.

In Comparative Example 7, the polymerizable composition had a urethane acrylate (S) content of lower than 2.5 wt % in terms of active components, which prevented the antifouling film from having long-term high antifouling properties.

In Comparative Example 8, although the polymerizable composition contained as a fluorine-based compound the urethane acrylate (S), the polymerizable composition further contained not the perfluoroalkyl-based monomer (T) but a perfluoroalkyl-based monomer having a fluorine atom concentration of lower than 50 wt %, which prevented the antifouling film from having long-term high antifouling properties.

In Comparative Example 9, although the polymerizable composition contained as a fluorine-based compound the urethane acrylate (S), the polymerizable composition further contained not the perfluoroalkyl-based monomer (T) but a perfluoroalkyl-based monomer having a fluorine atom concentration of higher than 60 wt %. The polymerizable composition was thus cloudy, which resulted in reduced transparency (whitening) of the antifouling film (polymer layer). Accordingly, evaluations for the antifouling properties and the rubbing resistance were not performed.

In Comparative Example 10, although the polymerizable composition contained as the polymerizable monomer (R) the multifunctional acrylate (R2), the polymerizable composition further contained not the bifunctional acrylate (R1) but a multifunctional acrylate containing an ethylene oxide group. The polymerizable composition was thus cloudy, which resulted in reduced transparency (whitening) of the antifouling film (polymer layer). Accordingly, evaluations for the antifouling properties and the rubbing resistance were not performed.

In Comparative Example 11, the polymerizable composition, having an ethylene oxide group concentration of higher than 50 wt %, was cloudy, which resulted in reduced transparency (whitening) of the antifouling film (polymer layer). Accordingly, evaluations for the antifouling properties and the rubbing resistance were not performed.

In Comparative Example 12, the polymerizable composition had an ethylene oxide group concentration of lower than 20 wt %, which prevented the antifouling film from having long-term high antifouling properties.

In Comparative Example 13, although the polymerizable composition contained as a fluorine-based compound the perfluoroalkyl-based monomer (T), the polymerizable composition further contained not the urethane acrylate (S) but a fluorine-containing polyether-based urethane acrylate, which prevented the antifouling film from having long-term high antifouling properties.

In Comparative Example 14, the polymerizable composition had a urethane acrylate (S) content of lower than 2.5 wt % in terms of active components and a perfluoroalkyl-based monomer (T) content of lower than 2.5 wt % in terms of active components, which prevented the antifouling film from having long-term high antifouling properties.

In Comparative Example 15, the polymerizable composition, having a perfluoroalkyl-based monomer (T) content of higher than 9 wt % in terms of active components, was cloudy, which resulted in reduced transparency (whitening) of the antifouling film (polymer layer). Accordingly, evaluations for the antifouling properties and the rubbing resistance were not performed.

In Comparative Example 16, the polymerizable composition had a polymerizable monomer (R) content of lower than 75 wt % in terms of active components, which reduced the rubbing resistance of the antifouling film.

[Additional Remarks]

An aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 75 to 95 wt % of a polymerizable monomer, 2.5 to 12.5 wt % of a urethane acrylate containing fluorine and an ester, and 2.5 to 9 wt % of a perfluoroalkyl-based monomer containing one (meth)acryloyl group for each molecule, the polymerizable monomer containing a bifunctional acrylate that contains an ethylene oxide group and a multifunctional acrylate that contains no ethylene oxide group, the perfluoroalkyl-based monomer having a fluorine atom concentration of 50 to 60 wt %, the polymerizable composition having an ethylene oxide group concentration of 20 to 50 wt %. This aspect achieves an antifouling film having excellent rubbing resistance and long-term high antifouling properties.

In the aspect of the present invention, the multifunctional acrylate may contain 3 to 6 functional groups. This embodiment can sufficiently increase the compatibility of the polymerizable monomer with other component(s) (e.g., fluorine-based compound) in the polymerizable composition and results in sufficiently increased transparency of the antifouling film (the polymer layer). This embodiment can also prevent an excessive increase in crosslinking density of the polymer layer, allows easy concentration of fluorine atoms in the fluorine-based compounds on a surface (the surface remote from the substrate) of the polymer layer, and tend to achieve an antifouling film having long-term high antifouling properties.

In the aspect of the present invention, the polymerizable monomer may further contain a monofunctional amide monomer. This embodiment can increase the compatibility of the polymerizable monomer with the fluorine-based compounds, which allows easy concentration of fluorine atoms in the fluorine-based compounds on the surface (the surface remote from the substrate) of the polymer layer and thus sufficiently increases the antifouling properties of the antifouling film. This embodiment can also inhibit shrinkage during curing of the polymerizable composition and increase the cohesion with the substrate, and thus can increase the adhesion between the polymer layer and the substrate.

In the aspect of the present invention, the polymerizable composition may contain 1 to 15 wt % of the monofunctional amide monomer in terms of active components. This embodiment can sufficiently increase the adhesion between the polymer layer and the substrate. This embodiment can also sufficiently increase the antifouling properties of the antifouling film. Furthermore, this embodiment can sufficiently increase the rubbing resistance of the antifouling film.

In the aspect of the present invention, the polymerizable composition may further contain a block copolymer containing a fluorine segment and a non-fluorine segment. This embodiment allows the non-fluorine segment to function as a compatible segment having compatibility with other component(s) in the polymerizable composition and allows concentration of the fluorine segment (fluorine atoms derived from the fluorine segment) on the surface (the surface remote from the substrate) of the polymer layer. This reduces the surface free energy of the polymer layer and sufficiently increases the antifouling properties of the antifouling film. Furthermore, the block copolymer tends to be fixed in the polymer layer by the compatible-segment function of the non-fluorine segment, which tends to impart long-term high antifouling properties to the antifouling film.

In the aspect of the present invention, the polymerizable composition may contain 0.1 to 5 wt % of the block copolymer in terms of active components. This embodiment can sufficiently increase the antifouling properties of the antifouling film. This embodiment can also increase the compatibility of the block copolymer with other component(s) in the polymerizable composition and result in sufficiently increased transparency of the antifouling film (the polymer layer).

In the aspect of the present invention, the polymerizable composition may further contain a photopolymerization initiator, and the photopolymerization initiator may contain an acylphosphine oxide-based photopolymerization initiator and an alkylphenone-based photopolymerization initiator. This embodiment can significantly increase the curability of the polymerizable composition, promote curing (significantly reduces uncured part) of the entire polymer layer (including the surface close to the substrate and the surface remote from the substrate), and thus resultantly allows easy concentration of fluorine atoms in the fluorine-based compounds on the surface (the surface remote from the substrate) of the polymer layer.

In the aspect of the present invention, the polymer layer may have a thickness of 5 to 20 μm. This embodiment allows easy concentration of fluorine atoms in the fluorine-based compounds on the surface (the surface remote from the substrate) of the polymer layer.

In the aspect of the present invention, the projections may be disposed at an average pitch of 100 to 400 nm. This embodiment can sufficiently prevent optical phenomena such as moiré and iridescence.

In the aspect of the present invention, the projections may have an average height of 50 to 600 nm. This embodiment can achieve both a preferred average height and a preferred average aspect ratio of the projections.

In the aspect of the present invention, the projections may have an average aspect ratio of 0.8 to 1.5. This embodiment can sufficiently prevent optical phenomena such as moiré and iridescence and achieves excellent antireflective properties. This embodiment can also sufficiently prevent occurrence of sticking and deterioration of die transferring condition in formation of an uneven structure, which are caused by poor processability of the uneven structure.

Another aspect of the present invention may be a polymerizable composition including in terms of active components: 75 to 95 wt % of a polymerizable monomer; 2.5 to 12.5 wt % of a urethane acrylate containing fluorine and an ester; and 2.5 to 9 wt % of a perfluoroalkyl-based monomer containing one (meth)acryloyl group for each molecule, the polymerizable monomer containing a bifunctional acrylate that contains an ethylene oxide group and a multifunctional acrylate that contains no ethylene oxide group, the perfluoroalkyl-based monomer having a fluorine atom concentration of 50 to 60 wt %, the polymerizable composition having an ethylene oxide group concentration of 20 to 50 wt %. This aspect achieves a polymerizable composition for providing a polymer layer of an antifouling film of an aspect of the present invention.

In another aspect of the present invention, the multifunctional acrylate may contain 3 to 6 functional groups.

In another aspect of the present invention, the polymerizable monomer may further contain a monofunctional amide monomer.

In another aspect of the present invention, the polymerizable composition may contain 1 to 15 wt % of the monofunctional amide monomer in terms of active components.

In another aspect of the present invention, the polymerizable composition may further contain a block copolymer containing a fluorine segment and a non-fluorine segment.

In another aspect of the present invention, the polymerizable composition may contain 0.1 to 5 wt % of the block copolymer in terms of active components.

In another aspect of the present invention, the polymerizable composition may further contain a photopolymerization initiator, and the photopolymerization initiator may contain an acylphosphine oxide-based photopolymerization initiator and an alkylphenone-based photopolymerization initiator.

What is claimed is:

1. An antifouling film comprising:
a substrate; and
a polymer layer disposed on a surface of the substrate and including on a surface thereof an uneven structure provided with projections at a pitch not longer than a wavelength of visible light,
the polymer layer being a cured product of a polymerizable composition,
the polymerizable composition containing, in terms of active components, 75 to 95 wt % of a polymerizable monomer, 2.5 to 12.5 wt % of a urethane acrylate containing fluorine and an ester, and 2.5 to 9 wt % of a perfluoroalkyl-based monomer containing one (meth)acryloyl group for each molecule,
the polymerizable monomer containing a bifunctional acrylate that contains an ethylene oxide group and a multifunctional acrylate that contains no ethylene oxide group,
the perfluoroalkyl-based monomer having a fluorine atom concentration of 50 to 60 wt %,
the polymerizable composition having an ethylene oxide group concentration of 20 to 50 wt %,
the polymerizable monomer further containing a monofunctional amide monomer, and
the polymerizable composition containing 1 to 15 wt % of the monofunctional amide monomer, in terms of active components.

2. The antifouling film according to claim 1,
wherein the multifunctional acrylate contains 3 to 6 functional groups.

3. The antifouling film according to claim 1,
wherein the polymerizable composition further contains a block copolymer containing a fluorine segment and a non-fluorine segment.

4. The antifouling film according to claim 3,
wherein the polymerizable composition contains 0.1 to 5 wt % of the block copolymer in terms of active components.

5. The antifouling film according to claim 1,
wherein the polymerizable composition further contains a photopolymerization initiator, and
the photopolymerization initiator contains an acylphosphine oxide-based photopolymerization initiator and an alkylphenone-based photopolymerization initiator.

6. The antifouling film according to claim 1,
wherein the polymer layer has a thickness of 5 to 20 μm.

7. The antifouling film according to claim 1,
wherein the projections are disposed at an average pitch of 100 to 400 nm.

8. The antifouling film according to claim 1,
wherein the projections have an average height of 50 to 600 nm.

9. The antifouling film according to claim 1,
wherein the projections have an average aspect ratio of 0.8 to 1.5.

10. A polymerizable composition comprising in terms of active components:
75 to 95 wt % of a polymerizable monomer;
2.5 to 12.5 wt % of a urethane acrylate containing fluorine and an ester; and
2.5 to 9 wt % of a perfluoroalkyl-based monomer containing one (meth)acryloyl group for each molecule,
the polymerizable monomer containing a bifunctional acrylate that contains an ethylene oxide group and a multifunctional acrylate that contains no ethylene oxide group,
the perfluoroalkyl-based monomer having a fluorine atom concentration of 50 to 60 wt %,
the polymerizable composition having an ethylene oxide group concentration of 20 to 50 wt %,
the polymerizable monomer further containing a monofunctional amide monomer, and
the polymerizable composition containing 1 to 15 wt % of the monofunctional amide monomer, in terms of active components.

* * * * *